(12) United States Patent
Balemi

(10) Patent No.: US 8,782,931 B2
(45) Date of Patent: Jul. 22, 2014

(54) COUPLERS

(75) Inventor: Timothy Craig Balemi, Manukau Auckland (NZ)

(73) Assignee: S T Couplers Limited, Auckland (NZ)

(*) Notice: Subject to any disclaimer, the term of this patent is extended or adjusted under 35 U.S.C. 154(b) by 32 days.

(21) Appl. No.: 13/515,123

(22) PCT Filed: Dec. 9, 2010

(86) PCT No.: PCT/NZ2010/000247
§ 371 (c)(1),
(2), (4) Date: Jun. 26, 2012

(87) PCT Pub. No.: WO2011/071394
PCT Pub. Date: Jun. 16, 2011

(65) Prior Publication Data
US 2012/0266432 A1 Oct. 25, 2012

(30) Foreign Application Priority Data

Dec. 9, 2009 (NZ) ......................................... 581777
Dec. 24, 2009 (NZ) ......................................... 582353

(51) Int. Cl.
E02F 3/96 (2006.01)

(52) U.S. Cl.
USPC .......................................................... 37/468

(58) Field of Classification Search
USPC ..................... 37/403, 409, 468; 172/272–275; 414/723, 724; 403/31, 320, 322.3, 403/322.1, 325, 331
See application file for complete search history.

(56) References Cited

U.S. PATENT DOCUMENTS

| 6,233,852 | B1 | 5/2001 | Pemberton |
| 6,379,075 | B1* | 4/2002 | Shamblin et al. .......... 403/322.1 |
| 6,691,438 | B2 | 2/2004 | Fatemi |
| 6,964,122 | B2* | 11/2005 | Cunningham et al. .......... 37/468 |
| 7,032,335 | B2* | 4/2006 | Short ................................. 37/468 |
| 2005/0214105 | A1* | 9/2005 | Steig et al. ..................... 414/723 |
| 2006/0037220 | A1 | 2/2006 | Cunningham et al. |
| 2009/0007465 | A1 | 1/2009 | Robl et al. |
| 2010/0232920 | A1 | 9/2010 | Calvert et al. |

FOREIGN PATENT DOCUMENTS

| NZ | 566977 | 11/2009 |
| WO | 2008/029112 | 3/2008 |
| WO | 2008/138932 | 11/2008 |
| WO | WO 2009/110808 | 9/2009 |

OTHER PUBLICATIONS

International Search Report, PCT/NZ2010/000247, Mar. 9, 2011.

* cited by examiner

*Primary Examiner* — Robert Pezzuto
(74) *Attorney, Agent, or Firm* — Young & Thompson

(57) ABSTRACT

A coupler for coupling implements having a first connecting pin and a second connecting pin, to a vehicle, for example, to the arm of an excavator. The coupler has a body component that is connectable to the vehicle, and which includes a forward recess for receiving the first connecting pin. The coupler also includes a movable component which is supported by the body component and which has an aft jaw or recess for receiving the second connecting pin and is movable through a range of travel relative to the body component. The movable component includes a rear locking member which is movable between an extended position in which the rear locking member can prevent the second connecting pin from exiting the aft recess and a retracted position in which the rear locking member can allow the second connecting pin to exit the aft recess.

20 Claims, 16 Drawing Sheets

Figure 1:
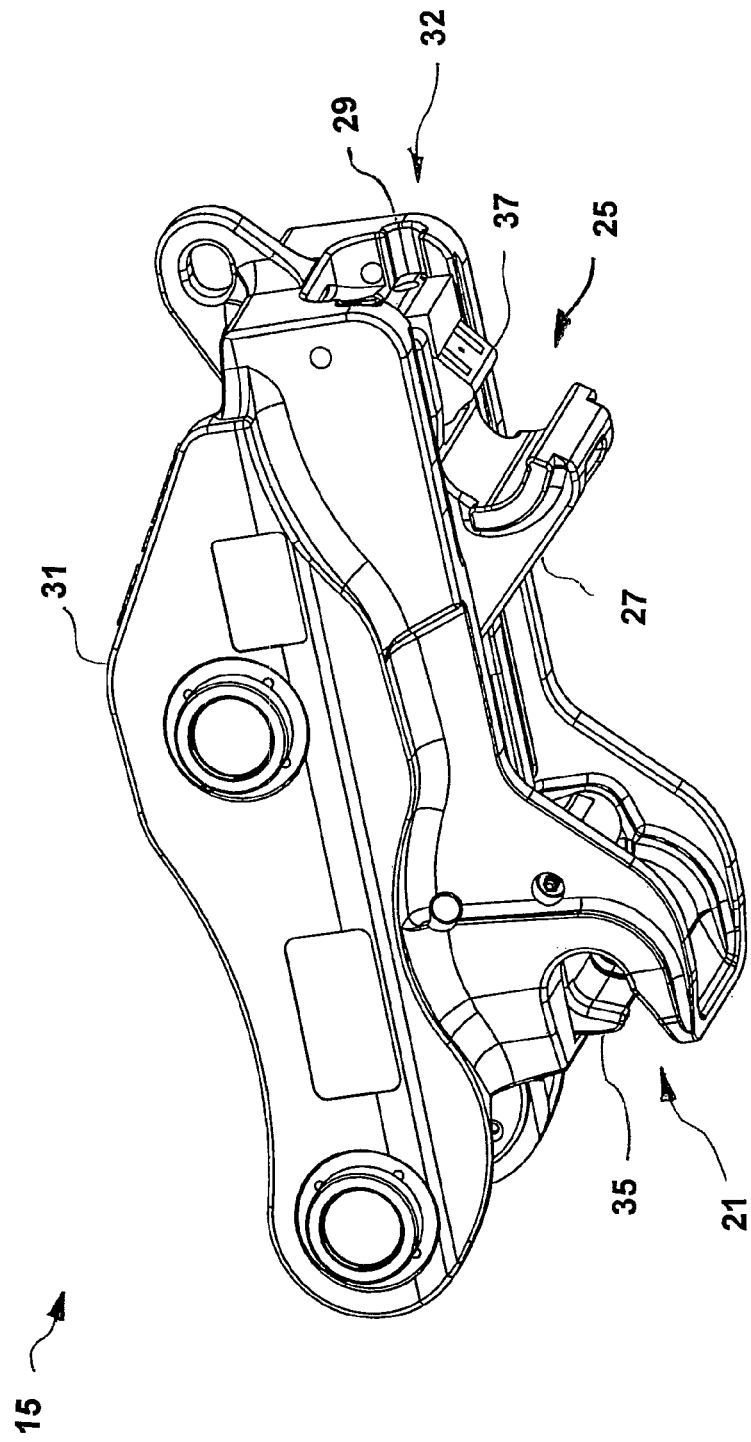

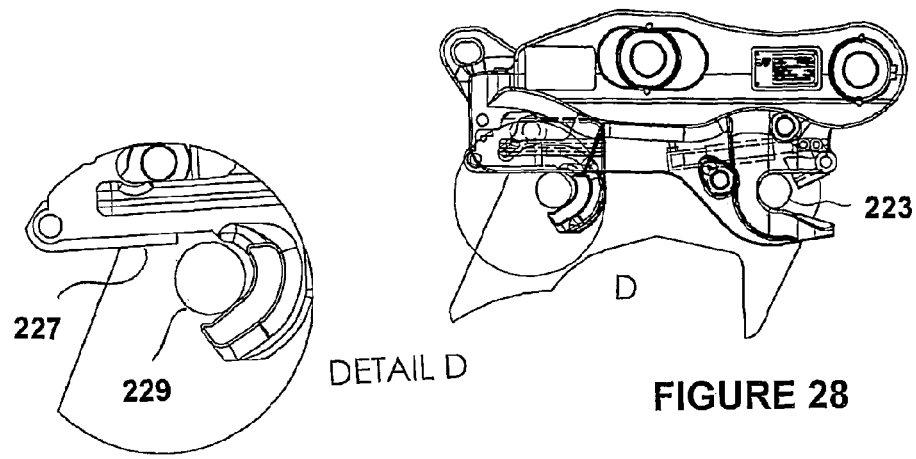
DETAIL D  FIGURE 28
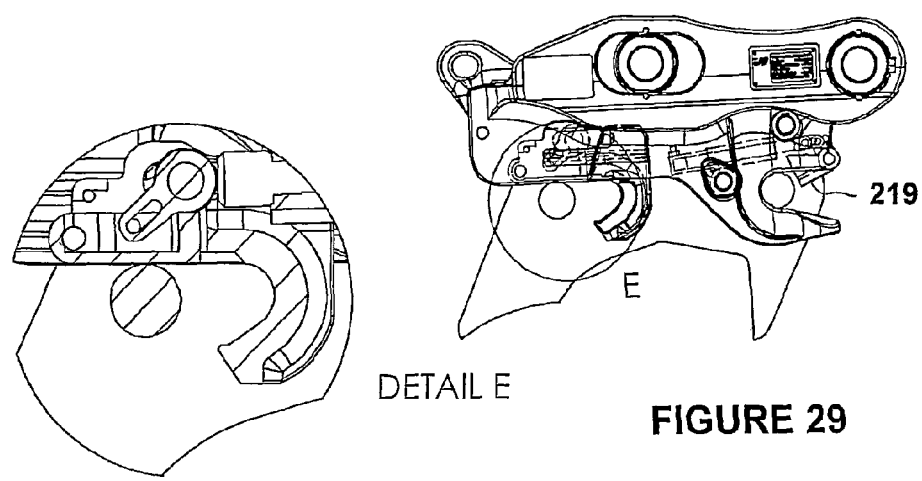
DETAIL E  FIGURE 29
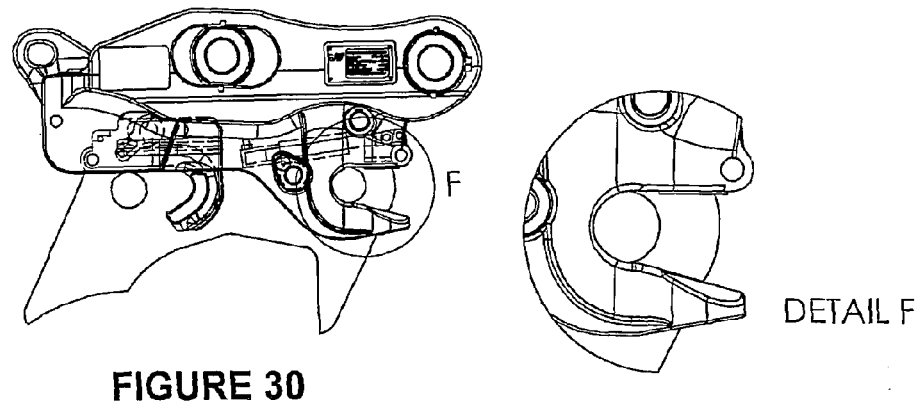
FIGURE 30  DETAIL F

COUPLERS

FIELD OF THE INVENTION

This invention relates to couplers, and in particular, but not exclusively to couplers for coupling implements to vehicles such as excavators, diggers and earth moving vehicles, and to methods of using the couplers.

BACKGROUND

Couplers, or hitches as they are sometimes called, are often used to connect implements to the arms of excavators, earth moving machines, diggers, back hoes, etc. The couplers are sometimes also referred to as "pin grabber" couplers as they grab the two connecting pins that are attached to many implements for the purpose of connecting the implement to an arm.

The couplers allow implements to be changed quickly and efficiently by being able to release the connecting pins of one implement, and to grab the connecting pins of another, using a remotely controlled hydraulic actuator on the coupler.

The ability to quickly change implements however, has lead to an increasing number of accidents involving implements coming loose, or falling from excavators etc. Most couplers today will have a safety locking feature that will hold one of the pins of an implement if the coupler fails, or if the other pin comes free for some reason.

However, it is apparent that a single safety lock feature is not sufficient. Accidents are still occurring as a result of the use of these quick change couplers. What is required is a secondary safety locking feature, and sometimes also a tertiary safety locking feature, to provide an improved level of safety, even if there is a failure of the first safety lock.

However, this requirement has proven to be difficult to achieve. Couplers will often have a fixed jaw, and a movable jaw. While it may be relatively straight forward to provide a locking system for a fixed jaw, the provision of a locking feature that is associated with the movable jaw is more challenging.

In addition, safety locks need to be relatively simple, to ensure high levels of reliability of the locks. Couplers are often used in harsh environments, and often become covered in dirt or grit, and must be robust to continue to function in such conditions. Safety locks must therefore be as simple as possible, and be robust in the operation, to ensure reliability and safe operation.

Size and weight are also a factor with couplers. Couplers that are excessively heavy, or which are bulky and have too great a distance between their connection to the arm, and their connection to the implement, can significantly limit the performance of a machine such as an excavator. The greater this distance is, the greater is the reduction in the maximum "break-out" force of the machine, caused by the coupler.

OBJECT

It is therefore an object of the present invention to provide a coupler which will at least go some way towards overcoming one or more of the above mentioned problems, or at least provide the public with a useful choice.

STATEMENTS OF THE INVENTION

Accordingly, in a first aspect, the invention may broadly be said to consist in a coupler assembly for coupling implements having a first connecting pin and a second connecting pin, to a vehicle, the coupler having;

a body component that is connectable to the vehicle, and which includes a forward recess for receiving the first connecting pin,
  a movable component which is supported by the body component and is movable through a range of travel relative to the body component, and which includes, or forms a part of, an aft recess for receiving the second connecting pin, and,
  an actuator for selectively moving the movable component relative to the body component, and wherein the movable component includes a rear locking member which is movable between an extended position in which the rear locking member can prevent the second connecting pin from exiting the aft recess and a retracted position in which the rear locking member can allow the second connecting pin to exit the aft recess.

Preferably the rear locking member is biased toward the extended position by a biasing means, for example a spring.

Preferably the rear locking member is configured such that when the second pin is situated within the aft recess, the second pin can only push the rear locking member in a direction that is away from its retracted position.

Preferably the movable component is slidable relative to the body component.

Preferably the body component includes guides which can guide the movement of the movable component.

Preferably the connection between the actuator and the movable component is a second slidable connection, comprising a second slidable member which is able to slide between a forward limit and an aft limit of a second guide member.

Preferably the second slidable member is a pin and the second guide member is an elongate slot in the movable component.

Preferably the second slidable member is connected to the actuator, and the slot is a feature of the movable component.

Preferably the rear locking member is linked to the actuator via at least one link member.

Preferably the, or each, link member is/are pivotally connected at or adjacent an upper end of the, or each, link member to the actuator.

Preferably the, or each, link member is pivotally connected at or adjacent a lower end of the, or each, link member to the rear locking member.

Preferably the distance between the pivotal connection of the rear locking member to the, or each, link member and the pivotal connection of the, or each, link member to the actuator, is a variable distance.

Preferably the rear locking member is connected to the, or each, link member via a third slidable connection.

Preferably movement of the second slidable connection from the aft limit toward the forward limit causes the link member to pull the rear locking member from its extended position and toward its retracted position.

Preferably the rear locking member can be pushed toward its retracted positioned by the second connecting pin as it enters the aft recess.

Optionally the, or each, link member rotates about its pivotal connection to the actuator and to move the rear locking member from its extended position toward its retracted position, due to contact with a between the, or each, link member and a surface on the movable component.

Preferably the coupler further includes a forward locking member which is movable between an extended position in which the forward locking member can prevent the first connecting pin from exiting the forward recess and a retracted position in which the forward locking member can allow the first connecting pin to exit the forward recess.

Preferably the forward locking member is caused to move between the extended position and the retracted position by contact with, and movement of, the movable component.

Preferably the forward locking member is biased toward the extended position by a biasing means, for example a spring.

Preferably the forward and the aft recesses each open to opposite directions.

Optionally the coupler assembly further includes a second actuator which is configured to selectively move the rear locking member between the extended position and the retracted position.

Preferably the second actuator is supported on the movable component.

Preferably the coupler assembly is connectable to a movable arm of the vehicle.

In a second aspect, the invention may broadly be said to consist in a coupler assembly for coupling implements having a first connecting pin and a second connecting pin, to a vehicle, the coupler having;
- a body component that is connectable to the vehicle, and which includes a forward recess for receiving the first connecting pin,
- a movable component which is supported by the body component and is movable through a range of travel relative to the body component, and which includes, or forms a part of, an aft recess for receiving the second connecting pin, and,
- a first actuator for selectively moving the movable component relative to the body component, and the movable component includes a rear locking member which is movable between an extended position in which the rear locking member can prevent the second connecting pin from exiting the aft recess and a retracted position in which the rear locking member can allow the second connecting pin to exit the aft recess, and wherein the coupler assembly further includes a second actuator which is configured to selectively move the rear locking member between the extended position and the retracted position.

Preferably the second actuator is supported on the movable component.

Preferably the rear locking member is biased toward the extended position by a biasing means, for example a spring.

Preferably the movable component is slidable relative to the body component.

Preferably the body component includes guides which can guide the movement of the movable component.

Preferably the rear locking member is pivotally connected to the movable component.

Preferably the rear locking member can be pushed toward its retracted positioned by the second connecting pin as it enters the aft recess.

Preferably the rear locking member is configured such that when the second pin is situated within the aft recess, the second pin can only push the rear locking member in a direction that is away from its retracted position.

Preferably the coupler further includes a forward locking member which is movable between an extended position in which the forward locking member can prevent the first connecting pin from exiting the forward recess and a retracted position in which the forward locking member can allow the first connecting pin to exit the forward recess.

Preferably the forward locking member is caused to move between the extended position and the retracted position by a third actuator.

Optionally both the rear locking member and the forward locking member are caused to move between their respective extended positions and retracted positions by the second actuator.

Optionally the forward locking member is caused to move between the extended position and the retracted position by contact with, and movement of, the movable component.

Preferably the forward locking member is biased toward the extended position by a biasing means, for example a spring.

Preferably the forward and the aft recesses each open to opposite directions.

Preferably the coupler assembly is connectable to a movable arm of the vehicle.

In a third aspect, the invention may broadly be said to consist in a vehicle, for example an excavator, earth moving machine, digger, or backhoe, incorporating at least one coupler assembly substantially as specified herein.

In a fourth aspect, the invention may broadly be said to consist in a method of coupling an implement to a vehicle using a coupler, wherein the coupler has a body component which includes a forward recess for retaining a first connecting pin of an implement, and a movable component which includes, or forms a part of, an aft recess for retaining a second connecting pin of the implement, the method including the steps of;
- engaging the first connecting pin of the implement into the forward recess,
- manipulating the coupler to allow the second connecting pin of the implement to be engaged in the aft recess,
- moving the movable component partly toward the aft end of its travel and thereby causing the second connecting pin to push a rear locking member from its extended position toward a retracted position, and
- continuing to move the movable component toward the aft end of its travel until the second connecting pin is engaged within the aft recess, and until the rear locking member is allowed to move back to its extended position in which it locks the second connecting pin within the aft recess.

Preferably the method includes the step of moving the movable component of the coupler to an aft end of its travel to retract a forward locking member associated with the forward recess, prior to engaging the first connecting pin of the implement in the forward recess.

Preferably the method includes the step of moving the movable component toward a forward end of its travel, thereby deploying the forward locking member to its extended position in which it locks the first connecting pin within the forward recess, after engaging the first connecting pin in the forward recess.

In a fifth aspect, the invention may broadly be said to consist in a method of uncoupling an implement from a vehicle using a coupler, wherein the coupler has a body component which includes a forward recess for retaining a first connecting pin of an implement, and a movable component which includes, or forms a part of, an aft recess for retaining a second connecting pin of the implement, the method including the steps of;
- retracting a rear locking member from the aft recess to allow the second connecting pin of the implement to be released from the aft recess,
- moving the movable component toward a forward end of its travel to disengage the second connecting pin from the aft recess.

Preferably a first actuator of the coupler is used to retract the rear locking member.

Preferably the first actuator of the coupler is used to both retract the rear locking member and to move the movable component.

Preferably the method of uncoupling the implement from a vehicle also includes the step of manipulating the coupler to allow the movable component to be moved toward the aft end of its travel without re-engaging the second connecting pin into the aft recess, after disengaging the second connecting pin from the aft recess.

Preferably the method of uncoupling the implement from a vehicle also includes the step of moving the movable component toward the aft end of its travel and thereby causing a forward locking member to be moved from an extended position to a retracted position, to allow the first connecting pin of the implement to be released from the forward recess, after disengaging the second connecting pin from the aft recess.

Preferably the method of uncoupling the implement from a vehicle also includes the step of manipulating the coupler or the implement to remove the first connecting pin from the forward recess, after moving the forward locking member to its retracted position.

Optionally the method of uncoupling the implement also includes a step of using a second actuator to retract a forward locking member to allow the first connecting pin to be released from the forward recess.

In a sixth aspect, the invention may broadly be said to consist in a method of coupling an implement to a vehicle using a coupler, wherein the coupler has a body component which includes a forward recess for retaining a first connecting pin of an implement, and a movable component which includes, or forms a part of, an aft recess for retaining a second connecting pin of the implement, the method including the steps of;
  engaging the first connecting pin of the implement into the forward recess,
  manipulating the coupler to allow the second connecting pin of the implement to be engaged in the aft recess,
  moving the movable component partly toward the aft end of its travel and thereby causing the second connecting pin to push a rear locking member from its extended position toward a retracted position, and
  continuing to move the movable component toward the aft end of its travel until the second connecting pin is engaged within the aft recess, and until the rear locking member is allowed to move back to its extended position in which it locks the second connecting pin within the aft recess.

Preferably the step of engaging the first connecting pin of the implement into the forward recess includes moving the body component toward the first connecting pin and thereby causing the first connecting pin to push a forward locking member from its extended position toward a retracted position and continuing to move the body component toward the first connecting pin until the first connecting pin is engaged within the forward recess, and until the forward locking member is allowed to move back to its extended position in which it locks the first connecting pin within the forward recess.

Optionally the method includes a step of moving the movable component toward a forward end of its travel, thereby deploying the forward locking member to its extended position in which it locks the first connecting pin within the forward recess, after engaging the first connecting pin in the forward recess.

Optionally the method includes a step of moving the movable component of the coupler to an aft end of its travel to retract a forward locking member associated with the forward recess, prior to engaging the first connecting pin of the implement in the forward recess.

In a seventh aspect, the invention may broadly be said to consist in a method of uncoupling an implement from a vehicle using a coupler, wherein the coupler has a body component which includes a forward recess for retaining a first connecting pin of an implement, and a movable component which includes, or forms a part of, an aft recess for retaining a second connecting pin of the implement, and the coupler includes a first actuator which is configured to move the movable component relative to the body component, the method including the steps of;
  using a second actuator to retract a rear locking member from the aft recess to allow the second connecting pin of the implement to be released from the aft recess,
  moving the movable component toward a forward end of its travel to disengage the second connecting pin from the aft recess.

Preferably the method further includes using a third actuator to retract a forward locking member from the forward recess to allow the first connecting pin of the implement to be released from the forward recess.

Optionally the method of uncoupling the implement from a vehicle also includes the step of manipulating the coupler to allow the movable component to be moved toward the aft end of its travel without re-engaging the second connecting pin into the aft recess, after disengaging the second connecting pin from the aft recess.

Optionally the method of uncoupling the implement from a vehicle also includes the step of moving the movable component toward the aft end of its travel and thereby causing a forward locking member to be moved from an extended position to a retracted position, to allow the first connecting pin of the implement to be released from the forward recess, after disengaging the second connecting pin from the aft recess.

Optionally the method of uncoupling the implement from a vehicle also includes the step of manipulating the coupler or the implement to remove the first connecting pin from the forward recess, after moving the forward locking member to its retracted position.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

DESCRIPTION

Figure 2:
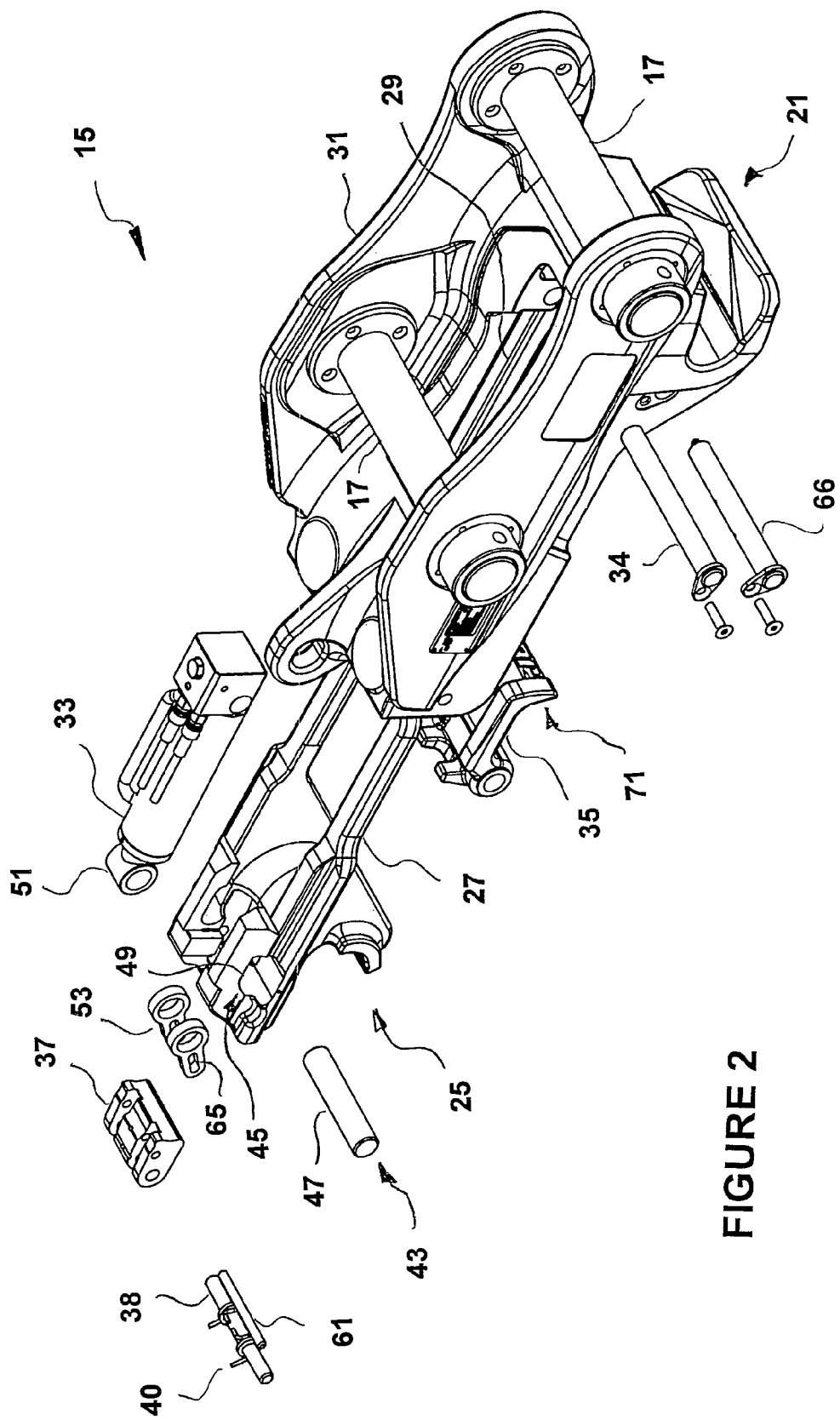
Figure 3:
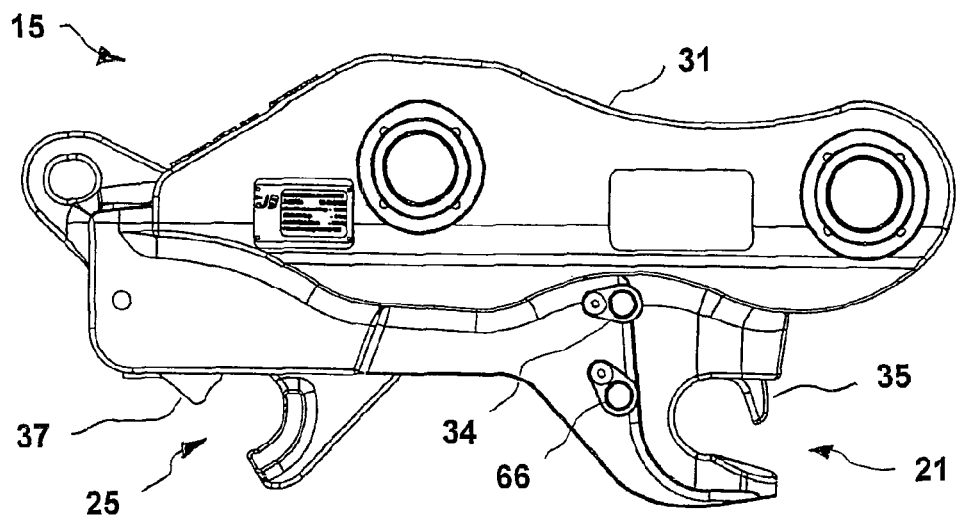
Figure 4:
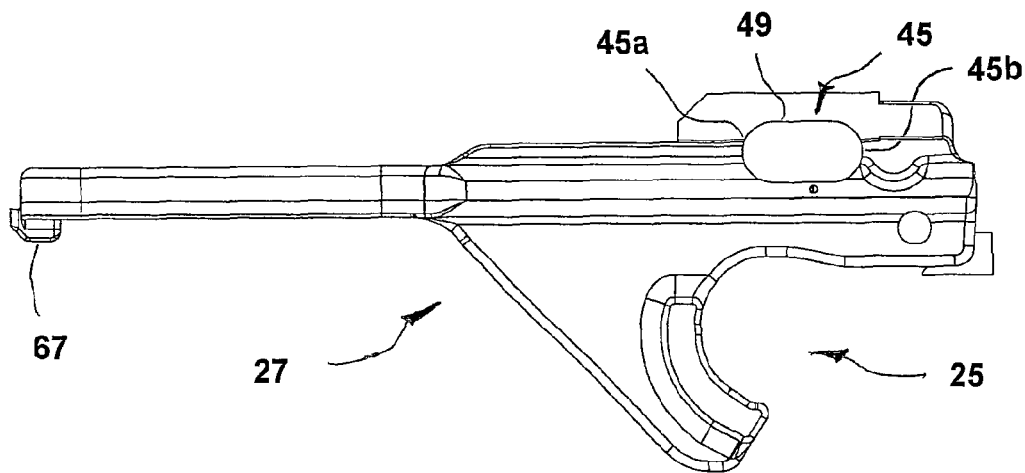
Figure 5:
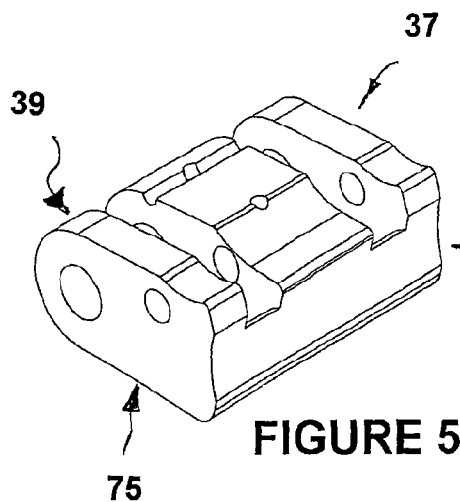
Figure 6:
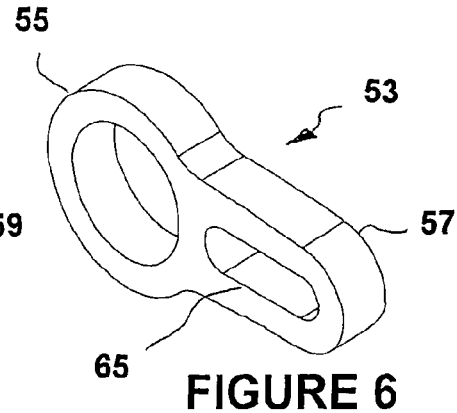
Figure 7:
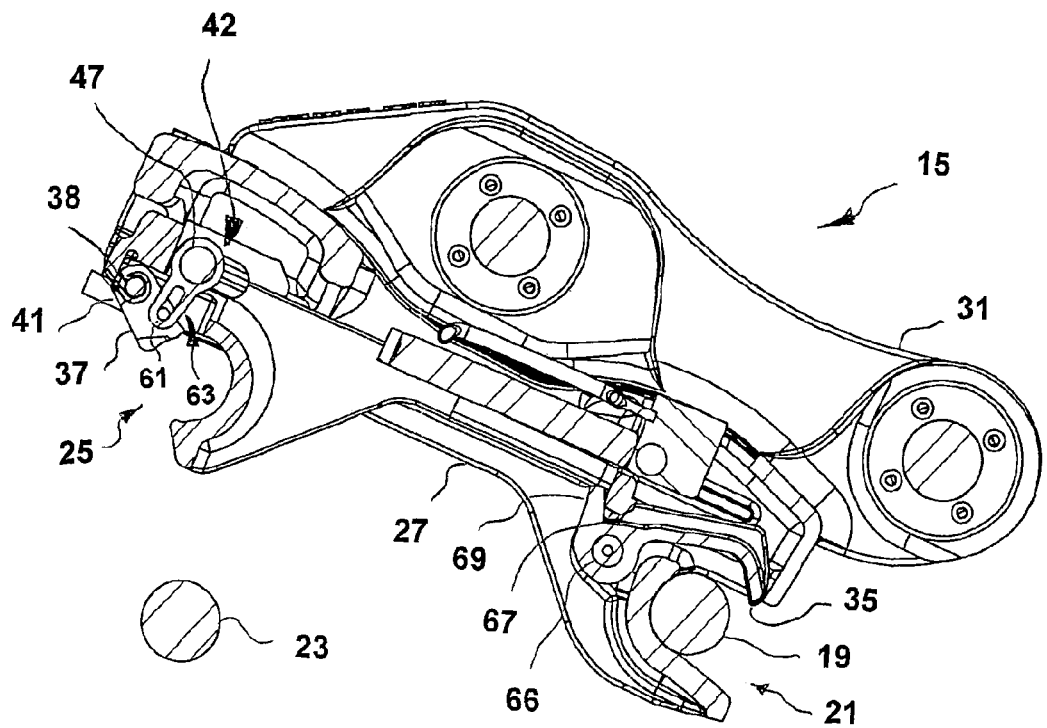
Figure 8:
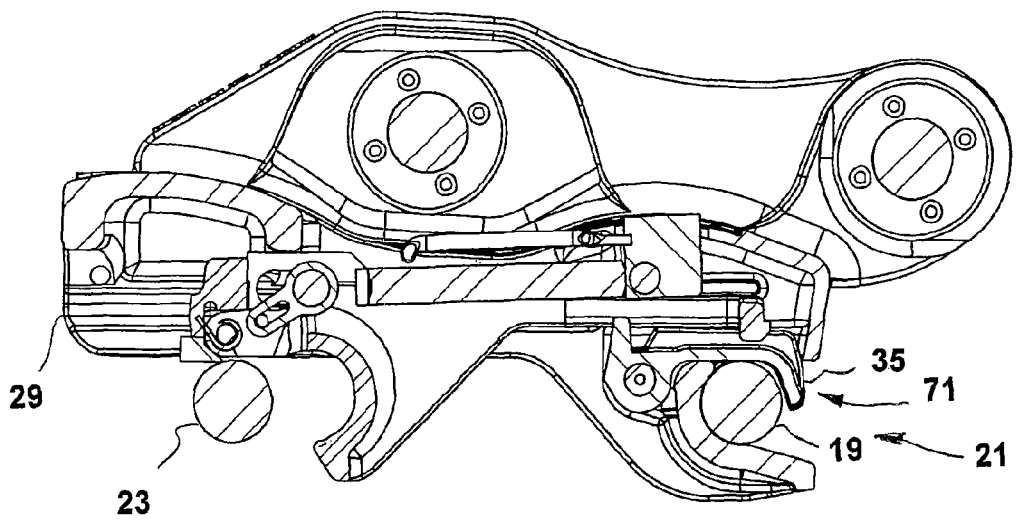
Figure 9:
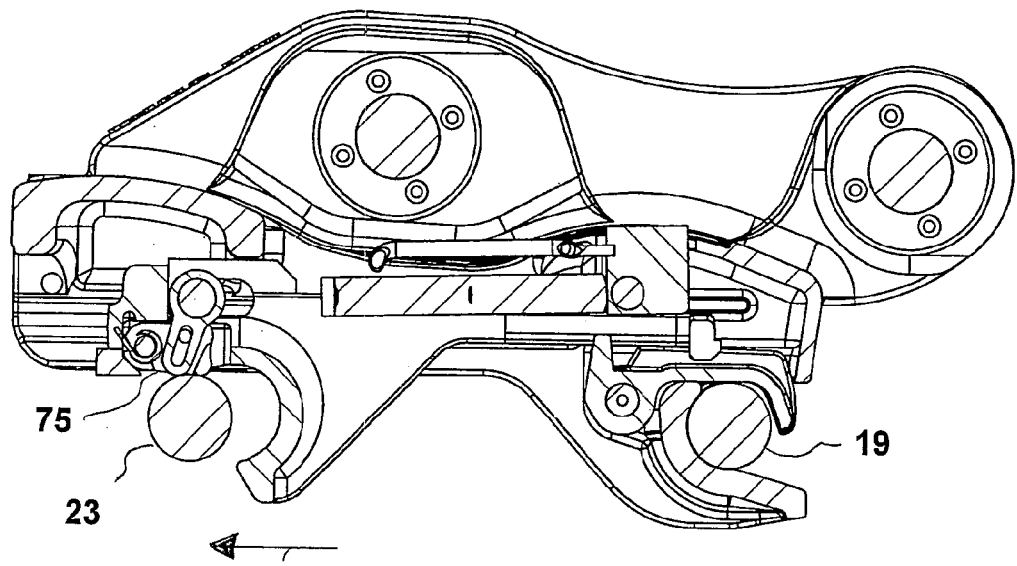
Figure 10:
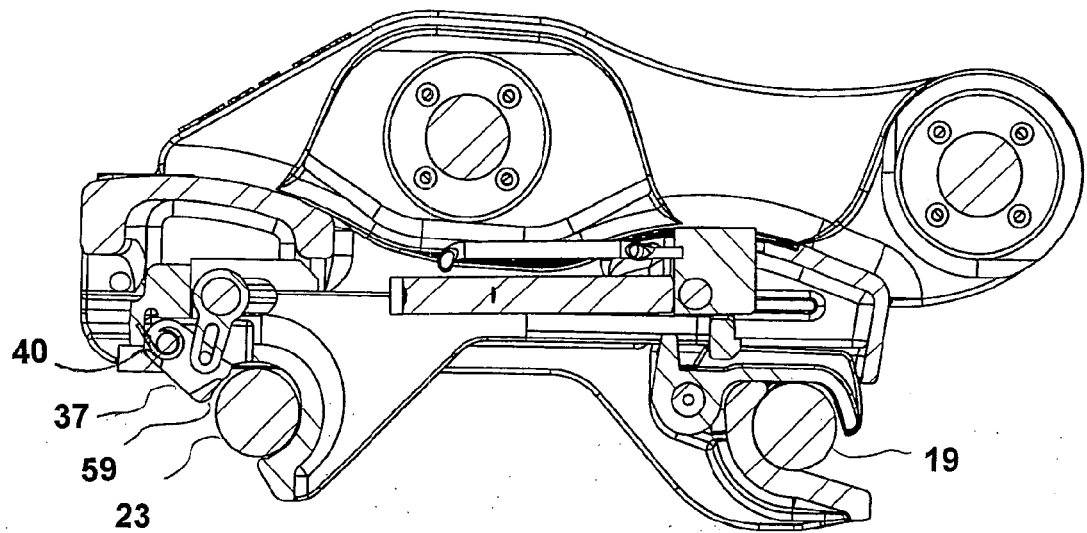
Figure 11:
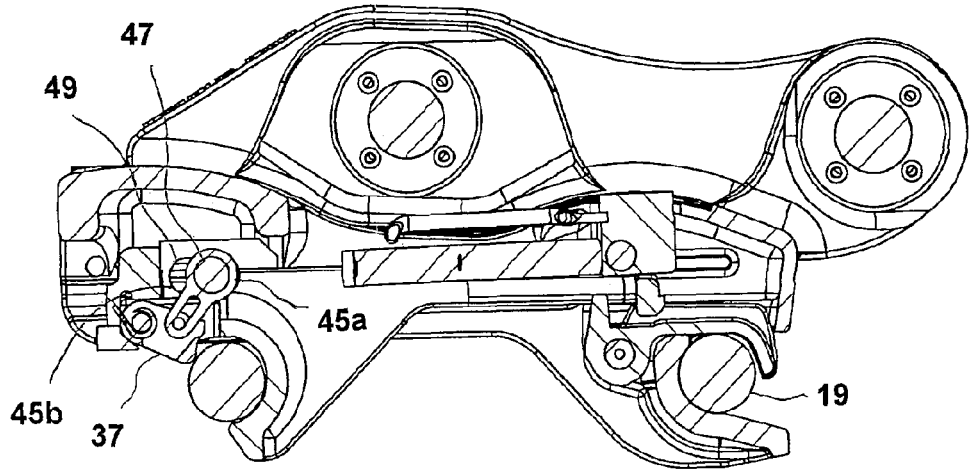
Figure 12:
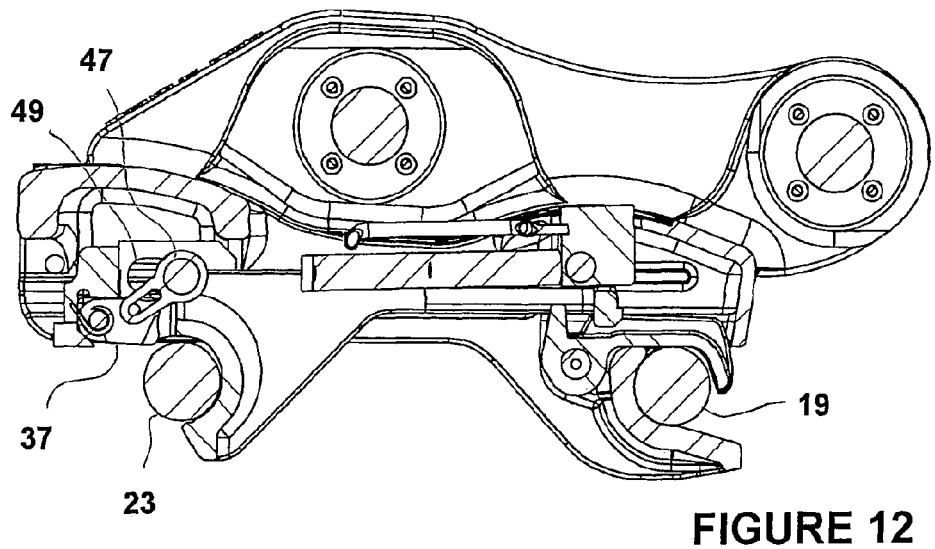
Figure 13:
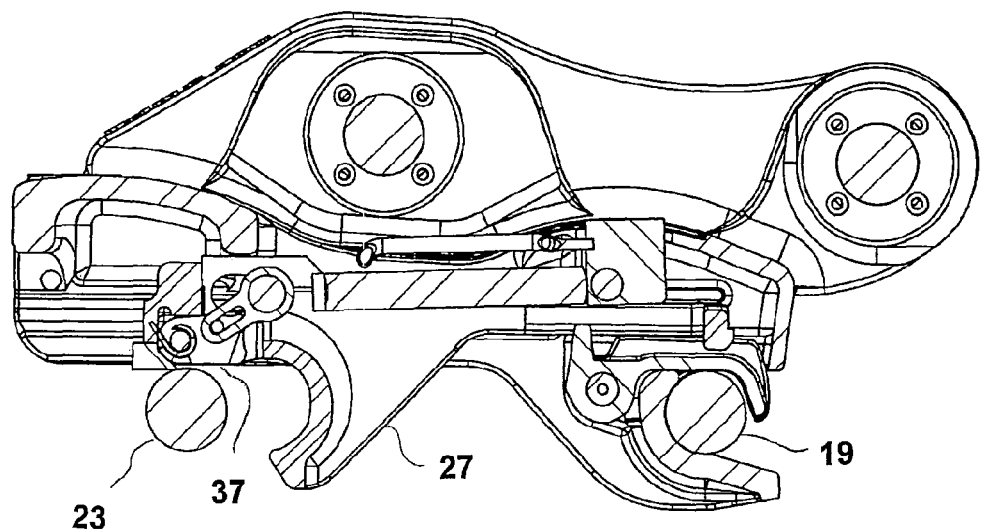
Figure 14:
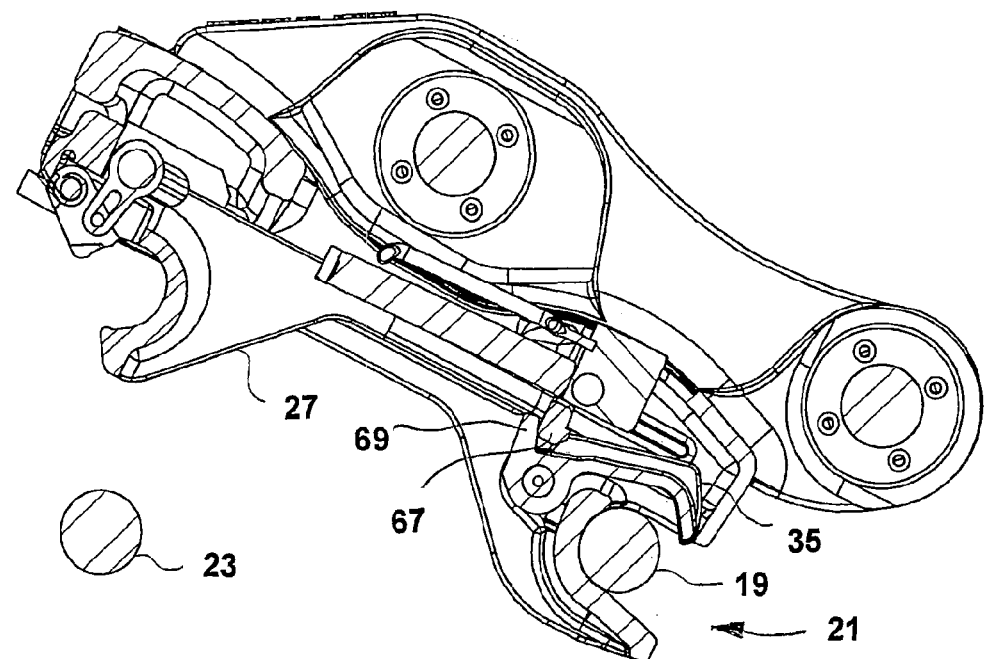
Figure 15:
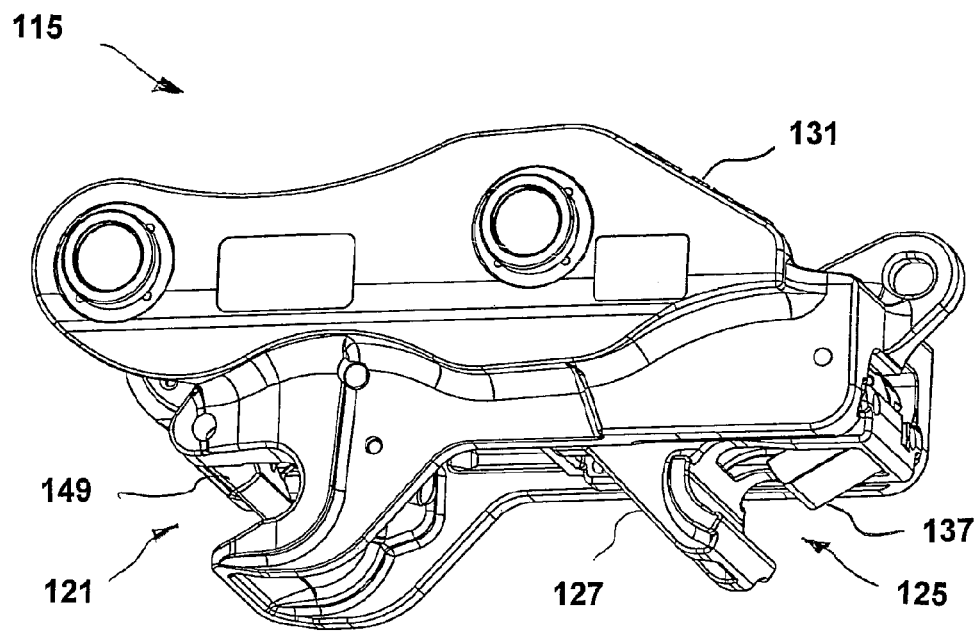
Figure 16:
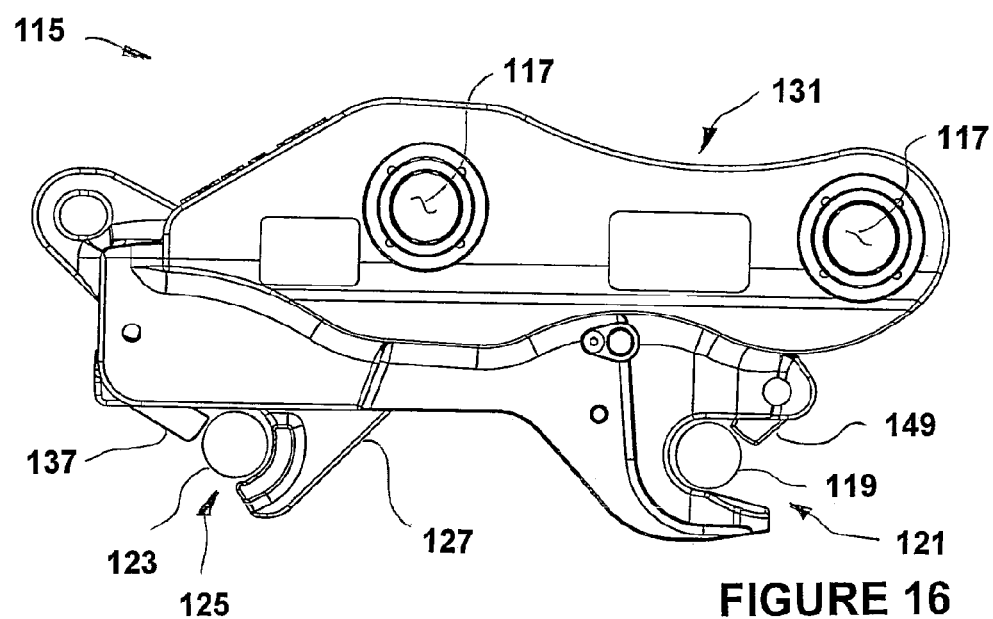
Figure 17:
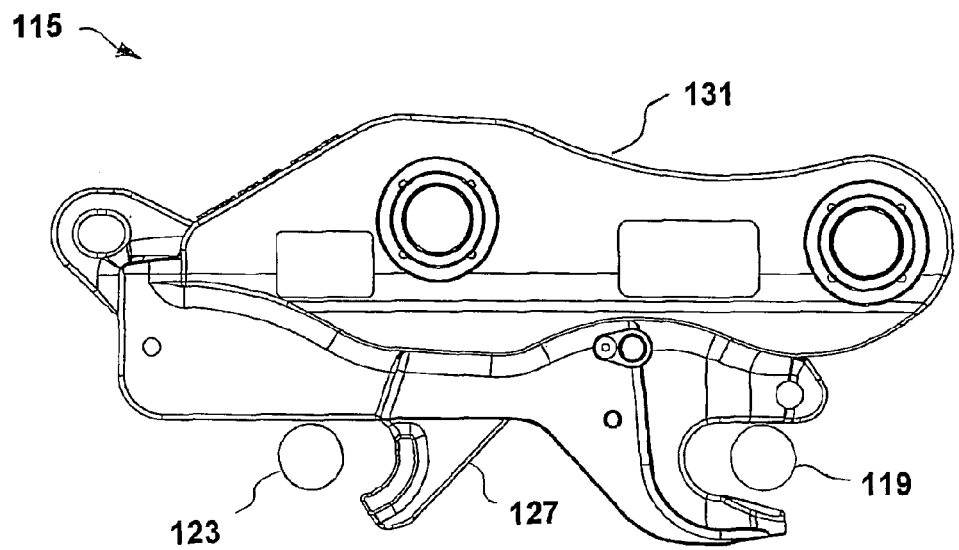
Figure 18:
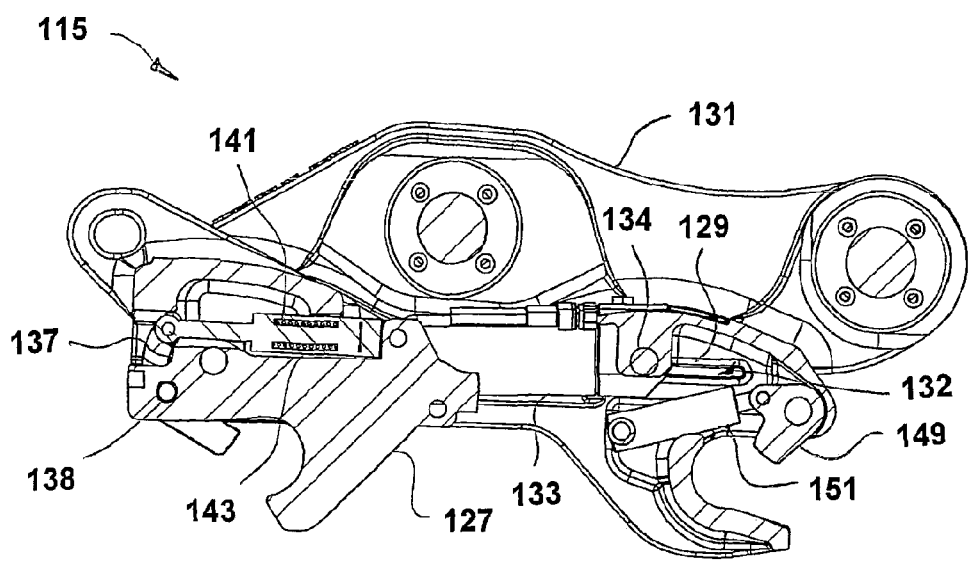
Figure 19:
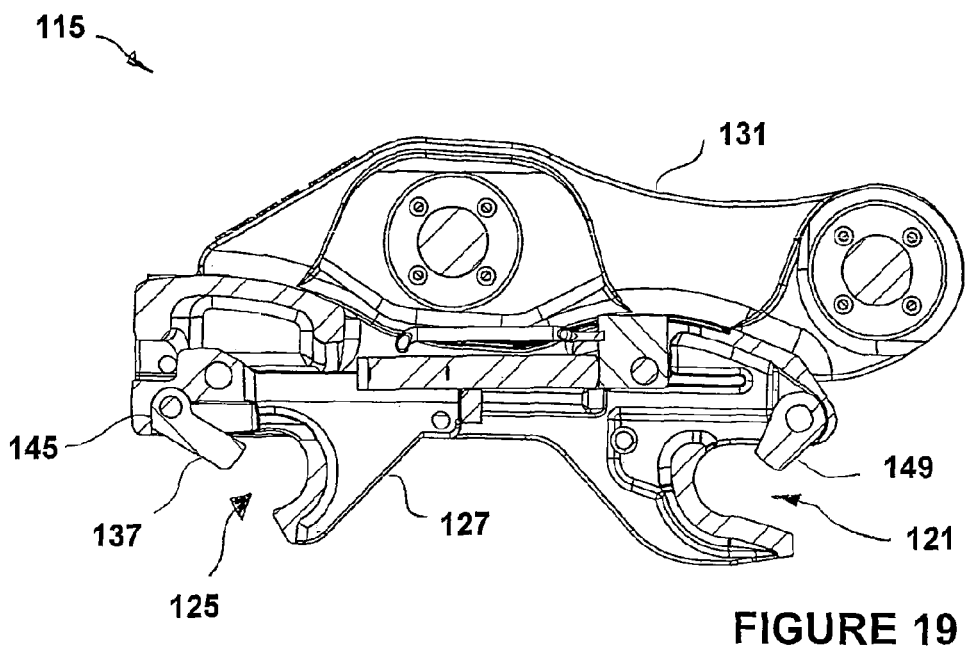
Figure 20:
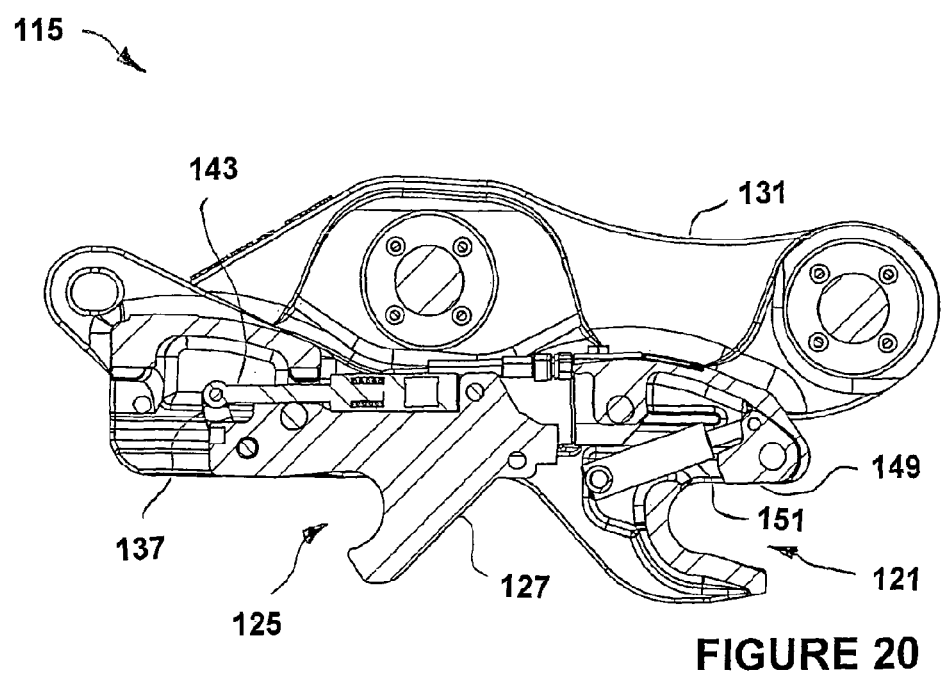
Figure 21:
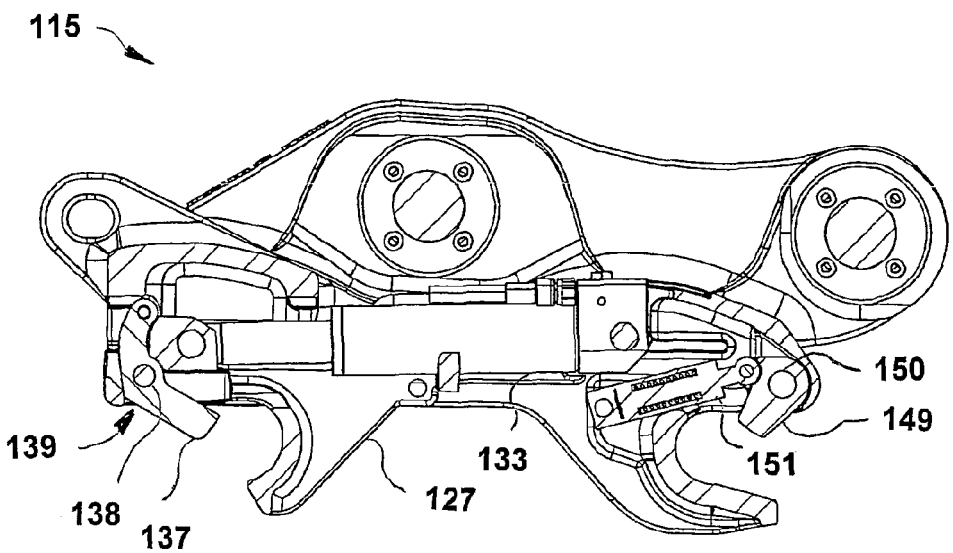
Figure 22:
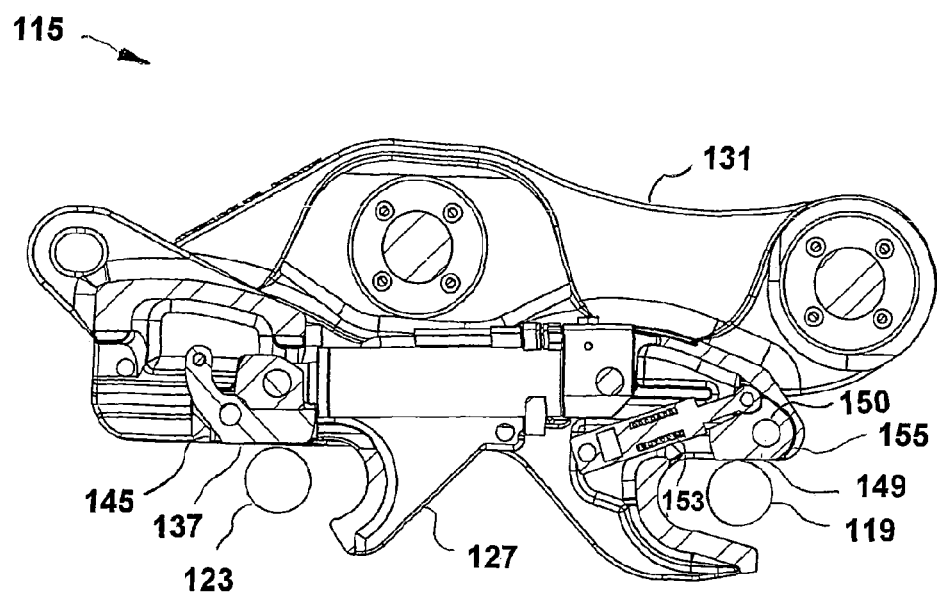
Figure 23:
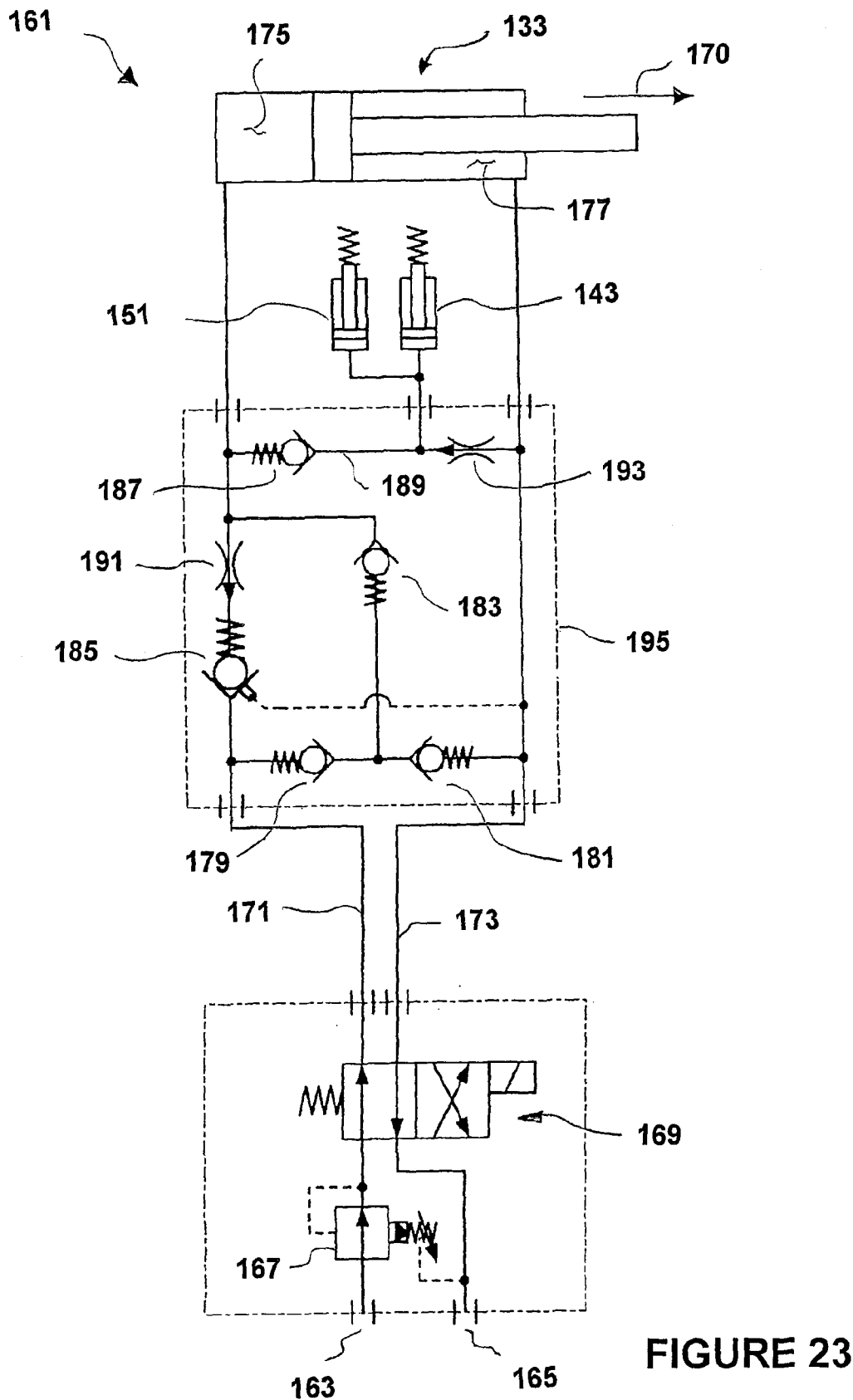
Figure 24:
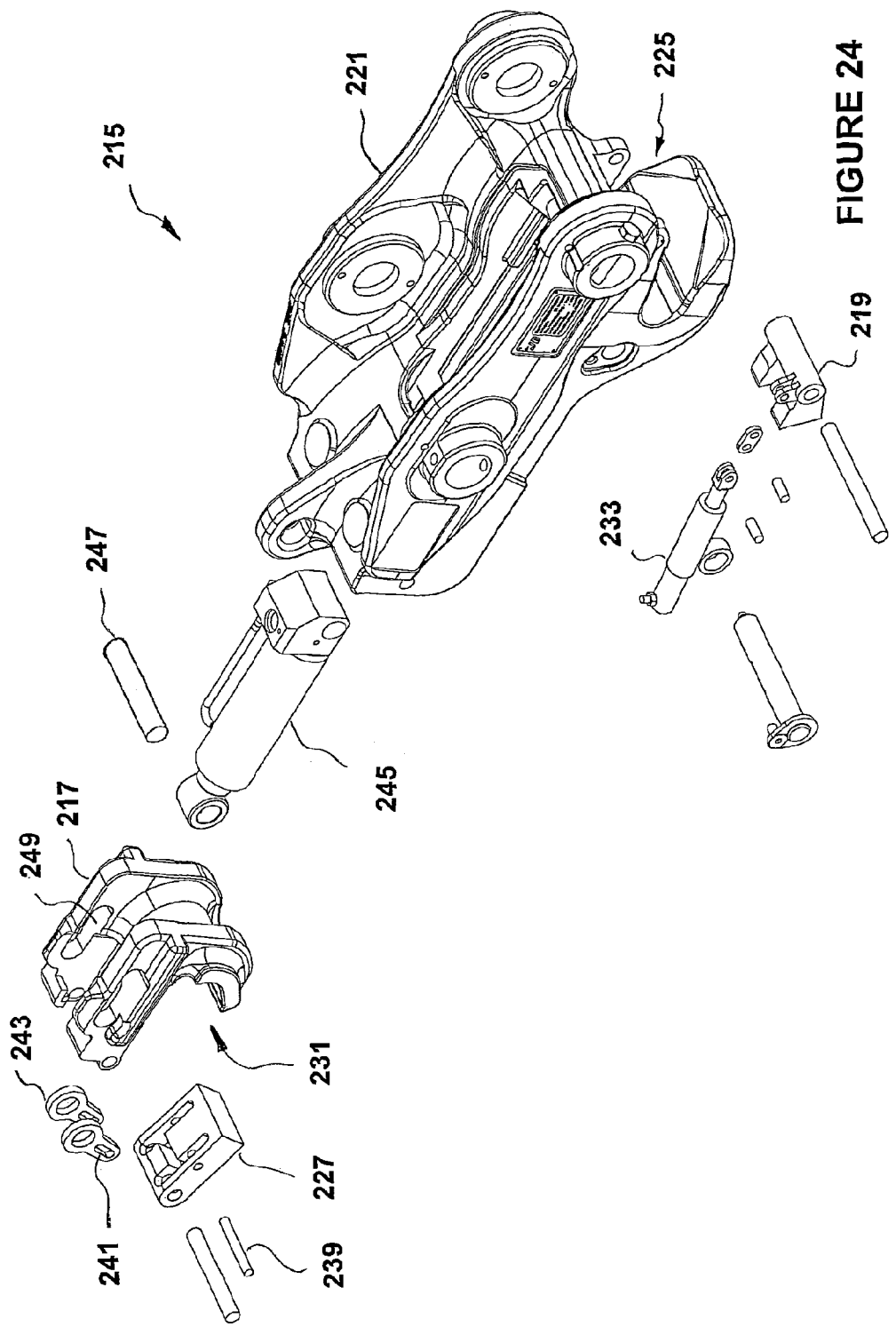
Figure 25:
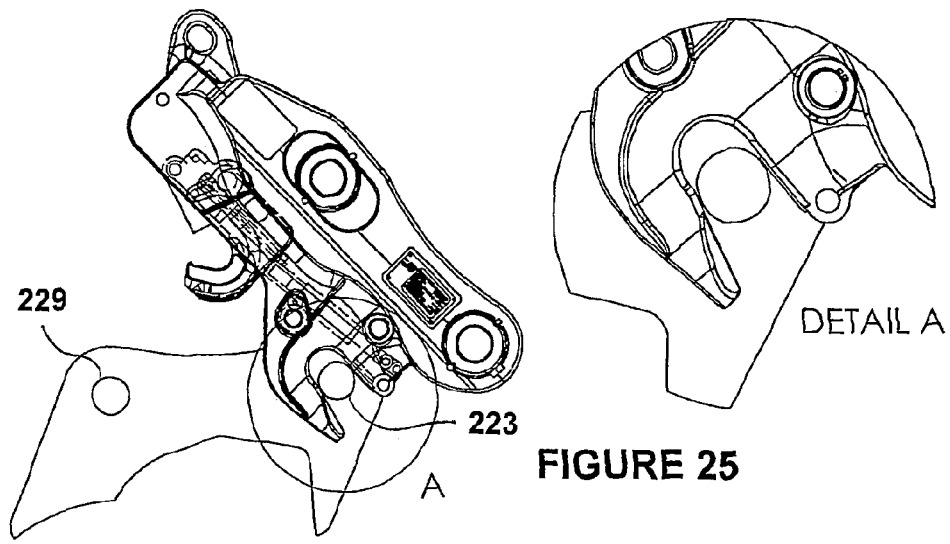
Figure 26:
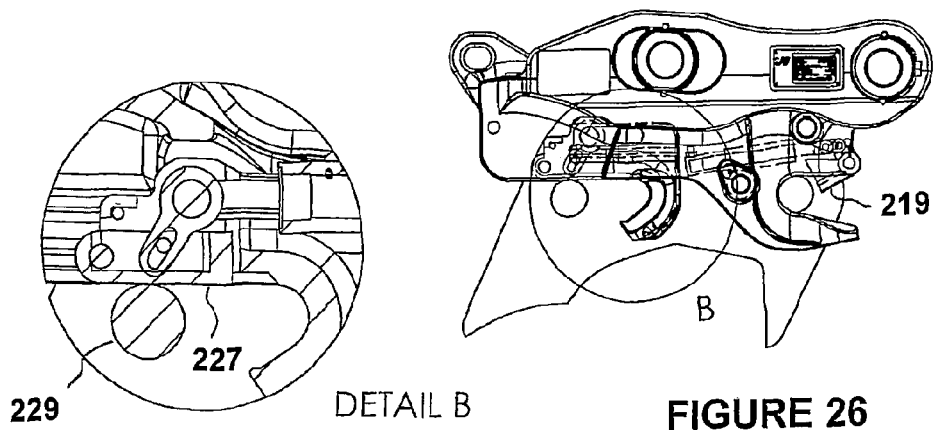
Figure 27:
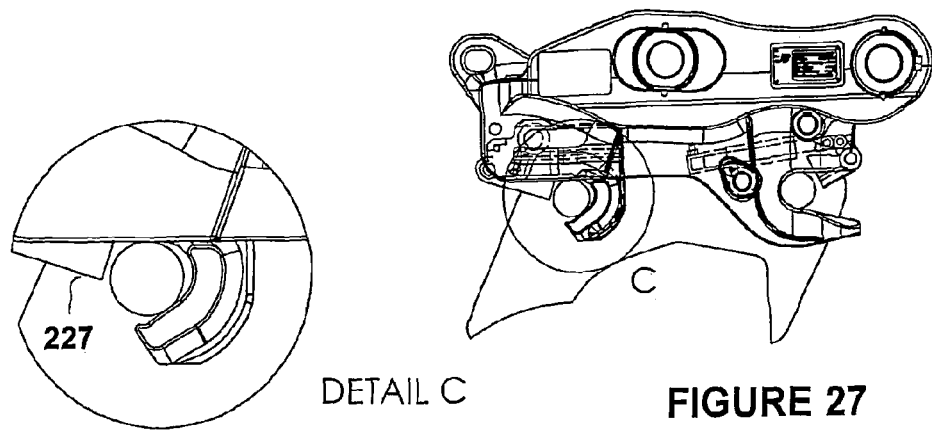
Figure 31:
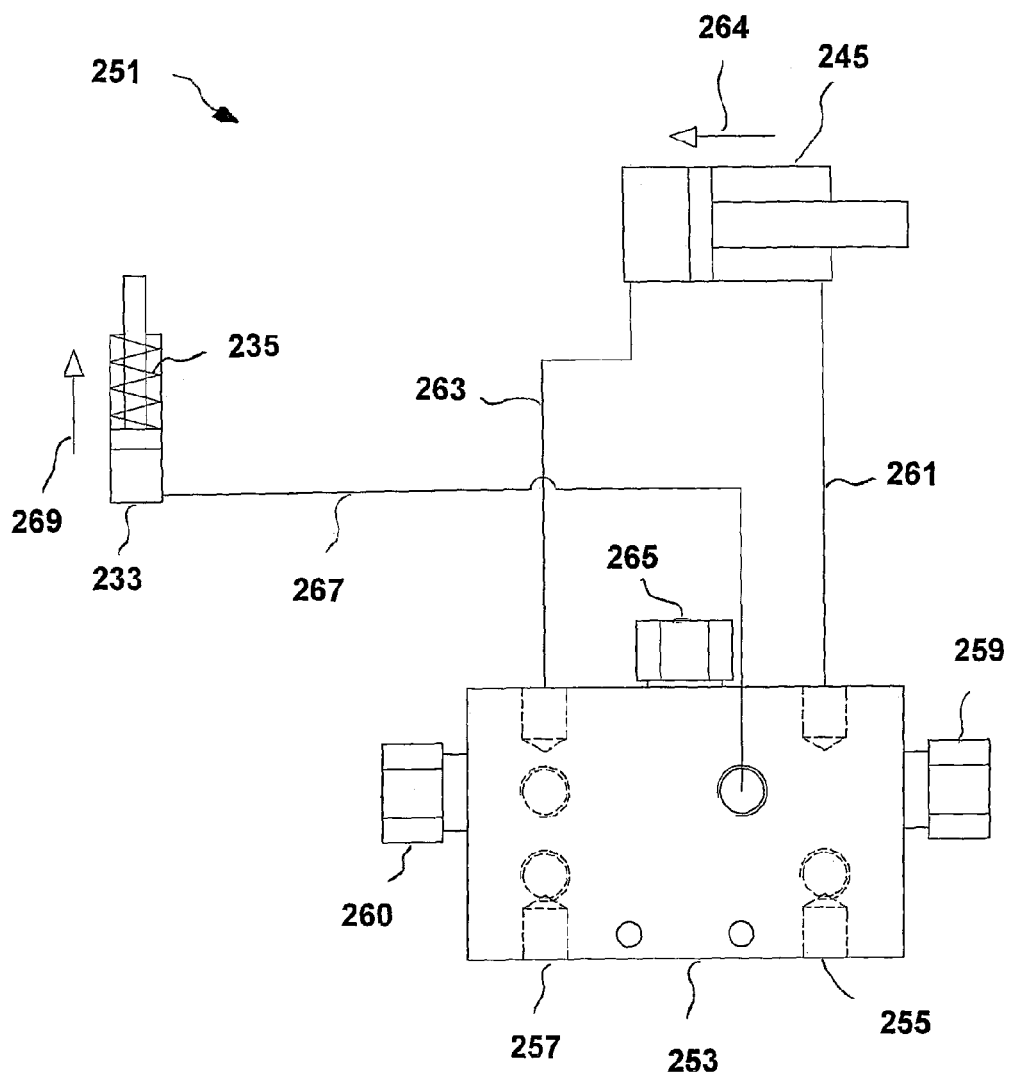

Further aspects of the present invention will become apparent from the following description which is given by way of example only and with reference to the accompanying drawings in which:

FIG. 1 is a lower, right, rear perspective view of a first example of a coupler, FIG. 2 is an exploded upper, left, front perspective view of the first example of a coupler, FIG. 3 is a left side elevation view of the first example of a coupler, FIG. 4 is a right side elevation of a slide of the first example of a coupler, FIG. 5 is a perspective view of a rear locking member of the first example of a coupler, FIG. 6 is a perspective view of a link member of the first example of a coupler, FIG. 7 is a cross sectional view showing the first example of a coupler configured to receive a forward pin of an implement in a forward jaw of the coupler, FIG. 8 is a cross sectional view showing the forward pin engaged and locked in place, and the first example of a coupler configured to receive a second connecting pin of an implement in an aft jaw of the coupler, FIG. 9 is a cross sectional view showing the rear locking member retracted by the second connecting pin as it is being engaged by the aft jaw, FIG. 10 is a cross sectional view showing the second connecting pin engaged in the aft jaw and locked in place, FIG. 11 is a cross sectional view showing the rear locking member being moved to a retracted position by an actuator of the first example of a coupler, FIG. 12 is a cross sectional view showing the rear locking member retracted to allow the second connecting pin to be disengaged from the first example of a coupler, FIG. 13 is a cross sectional view showing the second connecting pin disengaged from the aft jaw, FIG. 14 is a cross sectional view showing the coupler configured with the front lock retracted to allow the forward pin to be disengaged, FIG. 15 is a lower, right, rear perspective view of a second example of a coupler, FIG. 16 is a left side elevation view of the second example of a coupler showing both a forward lock member and a rear lock member in an extended position, FIG. 17 is a left side elevation view of the second example of a coupler with both the forward lock member and the rear lock member in a retracted position, FIG. 18 is a cross sectional view showing both the forward lock member and the rear lock member in the extended position, FIG. 19 is a second cross sectional view showing both the forward lock member and the rear lock member in the extended position, FIG. 20 is a cross sectional view showing both the forward lock member and the rear lock member in the retracted position, FIG. 21 is a third cross sectional view showing both the forward lock member and the rear lock member in the extended position, FIG. 22 is a second cross sectional view showing both the forward lock member and the rear lock member in the retracted position, FIG. 23 is a schematic diagram showing a hydraulic circuit suitable for the second example of a coupler, FIG. 24 is an exploded upper, left, front perspective view of a third example of a coupler, FIG. 25 is a left side elevation view of the third example of a coupler showing the coupler engaging with a first pin of an implement; an enlarged view of the forward jaw is shown in an accompanying Detail A, FIG. 26 is a left side elevation view of the third example of a coupler showing the coupler ready to engage with a second pin of the implement; an enlarged view of the rear jaw is shown in an accompanying Detail B, FIG. 27 is a left side elevation view of the third example of a coupler showing the coupler engaged with both the first and second pins of the implement; an enlarged view of the rear jaw is shown in an accompanying Detail C, FIG. 28 is a left side elevation view of the third example of a coupler showing the initial stage of the coupler being disengaged from the implement; an enlarged view of the rear jaw is shown in an accompanying Detail D, FIG. 29 is a left side elevation view of the third example of a coupler showing the coupler disengaged from the second pin of the implement; an enlarged view of the rear jaw is shown in an accompanying Detail E, FIG. 30 is a left side elevation view of the third example of a coupler showing the coupler ready to disengage from the first pin of the implement; an enlarged view of the rear jaw is shown in an accompanying Detail F, FIG. 31 is a schematic diagram showing a hydraulic circuit suitable for the third example of a coupler

FIRST EXAMPLE

With reference to FIGS. 1 to 7, a first example of a coupler (15) is described. The coupler (15) is connectable to a movable arm of a vehicle, and is of the type used to couple implements such as buckets to the arms of vehicles, for example to the arms of excavators, earth moving machines, diggers, backhoes, and the like.

The coupler (15) can be connected to the arm of the vehicle using two arm connecting pins (17). The coupler (15) is configured to hold a first connecting pin (19) of an implement in a forward recess or jaw (21), and a second connecting pin (23) of the implement in an aft recess or jaw (25). The forward and the aft jaws (21) and (25) each open to opposite directions.

In this example, the aft jaw (25) is a part of a movable component which is in the form of a slide (27). The slide (27) is connected to a body (31) of the coupler (15) by a first slidable connection (32). The slide (27) can slide through a range of travel relative to the body (31), in a substantially fore and aft direction, within guides (29) in the body (31). In this case, the guides (29) are two opposing longitudinal slots, one on each side of the body (31). Movement of the slide (27) in a forward direction is movement substantially toward the forward end of the body (31), that is toward the end of the body (31) having the forward jaw (21).

The coupler (15) is provided with an actuator (33), in this case a hydraulic ram, which can selectively move the slide (27) throughout its range of travel. The actuator is connected at its forward end to the body (31) using an actuator connecting pin (34). The actuator (33) can be remotely controlled allowing the coupler (15) to be operated from within the cab of a digger for example.

An important aspect of the coupler (15) is the provision of a rear locking member (37) on the slide (27) which is configured to lock the second connecting pin (23) within the aft jaw (25). The rear locking member (37) is movable between an extended position in which the rear locking member can prevent the second connecting pin (23) from exiting the aft jaw (25) and a retracted position in which the rear locking member (37) can allow the second connecting pin (23) to exit the aft jaw (25).

The rear locking member (37) is pivotally mounted to a rear end of the slide (27), using a first pivot pin (38) which passes through an aft section (39) of the rear locking member (37). The rear locking member (37) is biased toward the extended position by a biasing means which in this case includes a pair of torsion springs (40).

The rear locking member (37) is situated adjacent to the entrance to the aft jaw (25). When the rear locking member (37) is in its extended position it stops the second connecting pin (23) from exiting the aft jaw (25).

The rear locking member (37) is configured such that when the second connecting pin (23) is situated within the aft jaw (25), the second connecting pin (23) can only push the rear locking member (37) in a direction away from its retracted position. When the second connecting pin (23) is held within the aft jaw (25), if it moves, toward the rear locking member (37), it will contact the rear locking member (37) and attempt to rotate the rear locking member (37) about its pivotal connection to the slide (27), away from the retracted position. However, stops (41) located on a rear part of the slide (27) prevent further movement or rotation of the rear locking member (37) in this direction.

The connection between the actuator (33) and the slide (27) is a second slidable connection (42). The second slidable connection (42) comprises a second slidable member (43) which is able to slide between a forward limit (45a) and an aft limit (45b) of a second guide (45).

In this example, the second slidable member (43) includes a second pivot pin (47), and the second guide (45) is a first elongate slot (49) in the slide (27). The second slidable member (43), or second pivot pin (47), is connected to an eye end fitting on an aft end (51) of the actuator (33) (refer to FIG. 2), and the first elongate slot (49) is a feature of the slide (27) (refer to FIG. 4).

The rear locking member (37) is linked to the actuator (33) via two link members (53), and the second pivot pin (47). The link members (53) are pivotally connected at or adjacent an upper end (55) of each link member (53) to the actuator (33) via the second pivot pin (47). And the link members (53) are pivotally connected at or adjacent a lower end (57) of each link member (53) to the rear locking member (37). The link members (53) are pivotally connected to a forward end (59) of the rear locking member (37) via a third pivot pin (61) which passes through the rear locking member (37).

The distance between the pivotal connection of the rear locking member (37) to each link member (53) and the pivotal connection of each link member (53) to the actuator (33), is a variable distance. In this example the variable distance is achieved by a configuration in which the rear locking member (37) is connected to each link member (53) via a third slidable connection (63). This third slidable connection (63) includes the third pin (61) which is able to slide within a second elongate slot (65) in the lower end (57) of each link member (53).

The third pin (61) of the third slidable connection (63) can also prevent rotation of the rear locking member (37) past its extended position, away from the retracted position, when the pin (61) is at the lower limit of its travel within the second elongate slots (65) in the lower end (57) of each link member (53).

Movement of the second slidable connection (42) from the aft limit (45b) toward the forward limit (45a) causes the link members (53) to rotate or pull the rear locking member (37) from its extended position and toward its retracted position. This movement occurs when the actuator (33) begins to retract, and the second pivot pin (47) is pulled from the aft limit (45b) toward the forward limit (45a), and before the actuator (33) begins to move the slide (27) forward.

It is this retraction of the rear locking member (37), using the actuator (33) that is used when uncoupling an implement from the coupler (15).

The rear locking member (37) can also be pushed from its extended position and toward its retracted positioned by the second connecting pin (23) as it enters the aft jaw (25). This movement of the rear locking member (37) is possible because of the third slidable connection (63). When this happens, the second connecting pin (23) can push the rear locking member (37) toward its retracted positioned, against the force of the torsion spring (40). It is this retraction of the rear locking member (37), using the second connecting pin (23) that is used when coupling an implement to the coupler (15).

In this example, the coupler (15) further includes a forward locking member (35) which is pivotally connected to the body (31) using a fourth pivot pin (66). The forward locking member (35) is movable between an extended position in which the forward locking member (35) can prevent the first connecting pin (19) from exiting the forward jaw (21) and a retracted position in which the forward locking member (35) can allow the first connecting pin (19) to exit the forward jaw (21).

The forward locking member (35) is biased toward the extended position by a biasing means, for example a spring. Also, the forward locking member (35) is caused to move between the extended position and the retracted position by contact with, and movement of, the slide (27) as the slide (27) approaches an aft end of its range of travel within the body (31).

A first projection (67) which projects down from the forward end of the slide (27) contacts a second projection (69) on the forward locking member (35), and causes the forward locking member (35) to rotate about its pivotal connection to the body (31), when the slide (27) approaches an aft limit of its travel within the guides (29). This rotational movement of the forward locking member (35) moves a hook part (71) of the forward locking member (35) from an extended position to a retracted position.

FIGS. 7 to 14 show a sequence of "snap-shots" of the coupler (15), showing its method of operation when coupling and uncoupling an implement to, or from, the arm of a vehicle.

FIG. 7 shows the slide (27) fully aft, and with the first projection (67) of the slide (27) in contact with the second projection (67) of the forward locking member (35). Movement of the slide (27) to its fully aft position, and the contact between the first projection (67) and the second projection (67) causes the forward locking member (35) to move to its retracted position. When the forward locking member (35) is in its retracted position, the first connecting pin (19) of an implement (not shown) can be received into the forward jaw (21) as shown.

FIG. 8 shows the coupler (15) with the slide (27) moved toward a forward end of its travel. Once the slide (27) is moved away from its aft extent of travel, the first projection (67) disengages from the second projection (67) and the forward locking member (35) returns to its extended position. Moreover, the forward end of the slide (27) then overlies the forward locking member (35) and holds it positively in its extended position. In this configuration, the first connecting pin (19) is locked within the forward jaw (21) and cannot be released until the slide is returned to its aft extent of travel.

In this configuration it can be seen that the second pivot pin (47) has been pulled toward the forward limit (45a) of its travel within the first elongate slot (49). This has increased the distance between the second pivot pin (47) and the first pivot pin (38), causing the rear locking member (37) and the link member (53) to become more aligned, which has pulled the rear locking member (37) away from its extended position and toward its retracted position.

FIGS. 9 and 10 show a sequence that allows the second connecting pin (23) to be received into, and locked within, the aft jaw (25). In FIG. 9, the first connecting pin (19) is shown captured within the forward jaw (21), and the slide (27) is shown being moved in an aft direction (73) to capture the second connecting pin (23) within the aft jaw (25).

It can be seen that the second pivot pin (47) has been pushed toward the aft limit (45b) of its travel within the first elongate slot (49). This allows the aft locking member (37) to return to its extended position. However, contact between the second connecting pin (23) and an underside (75) of the rear locking member (37) causes the rear locking member (37) to be pushed away from its extended position and toward its retracted position. The third slidable connection (63) described above, allows the rear locking member (37) to move to its retracted position since it allows the third pivot pin (61) to slide up the second elongate slot (65) in each link member (53).

In FIG. 10, the second connecting pin (23) is shown received fully within the aft jaw (25) and locked in place by the rear locking member (37). As the slide member (27) moved further aft to capture the second connecting pin (23), the contact between the underside (75) of the rear locking member (37) and the second connecting pin (23) was lost and the rear locking member (37) returned to its extended position under the action of the springs (40).

In this configuration the second connecting pin (23) cannot exit the aft jaw (25) since contact between the second connecting pin (23) and the forward end (59) of the rear locking member (37) will not cause it to move to its retracted position, but rather tends to hold the rear locking member (37) in its extended position.

FIGS. 11 to 13 show a sequence of operation that allows the second connecting pin (23) to be released from the aft jaw (25). This sequence is used when uncoupling an implement from the coupler (15).

When the actuator (33) is initially commanded to retract, or to move the slide (27) forward, the first thing that happens is that the slide (27) remains stationary and the second pivot pin (47) is dragged from its aft limit of travel (45b) and towards its forward limit of travel (45a) within the first elongate slot (49). As the second pivot pin (47) moves towards its forward limit of travel (45a), the distance between the second pivot pin (47) and the first pivot pin (38) increases. This causes the rear locking member (37) and the link member (53) to become more aligned, and this pulls the rear locking member (37) away from its extended position and toward its retracted position. The rear locking member (37) is shown partly retracted in FIG. 11, and fully retracted in FIG. 12.

As the actuator (33) continues to move the second pivot pin (47) forward, and after it has contacted its forward limit of travel (45a), the actuator (33) will begin to move the slide (27) forward. FIG. 13 shows the slide (27) moved forward from its position in FIGS. 11 and 12, and the aft jaw (25) has been moved away from the second connecting pin (23), allowing the second connecting pin (23) to be released from the coupler (15).

FIG. 14 shows the coupler (15) manipulated away from the second connecting pin (23) so that the slide (27) can be moved to the aft extent of its travel without re-engaging with the second connecting pin (23). In this "snap-shot" the slide (27) is in fact shown at the aft extent of its travel. Since the slide (27) is at its fully aft position, contact between the first projection (67) and the second projection (67) has caused the forward locking member (35) to be rotated to its retracted position. And since the forward locking member (35) is in its retracted position, the first connecting pin (19) can be released from the forward jaw (21).

It is envisaged that the coupler (15), or a variation of it, can be included as a part of a vehicle, for example, as part of an excavator, earth moving machine, digger, or backhoe.

Method of Operation of the First Example

The method of coupling an implement to a vehicle, when using the coupler (15), includes the steps of;

engaging the first connecting pin (19) of the implement into the forward jaw (21), manipulating the coupler (15) to allow the second connecting pin (23) of the implement to be engaged in the aft jaw (25), moving the movable component, or slide (27), partly toward the aft end of its travel and thereby causing the second connecting pin (23) to push the rear locking member (37) from its extended position toward a retracted position, and continuing to move the movable component (27) toward the aft end of its travel until the second connecting pin (23) is engaged within the aft jaw (25), and until the rear locking member (37) is allowed to move back to its extended position in which it locks the second connecting pin (23) within the aft jaw (25).

The method can also include the step of moving the movable component (27) of the coupler (15) to an aft end of its travel to retract the forward locking member (35), prior to engaging the first connecting pin (19) of the implement in the forward jaw (21).

The method can also include the step of moving the movable component (27) toward a forward end of its travel, thereby deploying the forward locking member (35) to its extended position in which it locks the first connecting pin (19) within the forward jaw (21), after engaging the first connecting pin (19) in the forward jaw (21).

The method of uncoupling an implement from a vehicle, when using the coupler (15), includes the steps of;

retracting the rear locking member (37) from the aft jaw (25) located on the movable component (27) of the coupler (15), to allow the second connecting pin (23) of the implement to be released from the aft jaw (25), moving the movable component (27) toward a forward end of its travel to disengage the second connecting pin (23) from the aft jaw (25).

An actuator (33) of the coupler (15) is used to retract the rear locking member (37). The actuator (33) is used to both retract the rear locking member (37) and to move the movable component, or slide (27).

The method of uncoupling the implement can also include the step of manipulating the coupler (15) to allow the movable component (27) to be moved toward the aft end of its travel without re-engaging the second connecting pin (23) into the aft jaw (25), after disengaging the second connecting pin (23) from the aft jaw (25).

A method of uncoupling the implement can also include the step of moving the movable component (27) toward the aft end of its travel and thereby causing a forward locking member (35) to be moved from an extended position to a retracted position, to allow the first connecting pin (19) of the implement to be released from the forward jaw (21), after disengaging the second connecting pin (23) from the aft jaw (25).

The method of uncoupling the implement can also include the step of manipulating the coupler (15) or the implement to remove the first connecting pin (19) from the forward jaw (21), after moving the forward locking member (35) to its retracted position.

Variations of the First Example

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

In the first example described above, the coupler (15) includes a movable component in the form of a slide (27). In an alternative configuration the movable component could have an alternative form of movement, for example a movable component that can move through a range of travel about a pivot.

In the example described above, the forward locking member (35) is a separate component that is pivotally connected to the body (31), and which is moved and held by the movable component, or slide (27). However, in an alternative configuration, the forward locking member (35) could be an extension of the movable component, or slide (27). In such a case, the forward locking member (35) can be configured to restrict access of the first connecting pin (19) into or out of the forward jaw (21) by blocking the entrance to the forward jaw (21) when in some parts of its range of travel. For example, when the slide (27) is moved to the aft end of its range of travel the forward locking member (35) could be withdrawn from the entrance way to the first jaw (21), and when the slide (27) is moved away from the aft end of its range of travel it blocks the entrance to the forward jaw (21).

In the example described above, the actuator (33) is described as hydraulic ram, however, in an alternative configuration the actuator (33) could be an electrical or a pneumatic actuator.

In the example described above, the coupler (15) includes two link members (53). However, in an alternative configuration, the coupler could include a single link member (53), or more than two.

In an alternative configuration, the coupler (15) could further include a second actuator which is configured to selectively move the rear locking member (39) between the extended position and the retracted position. In such a configuration, the second slidable connection (42) would not be required, and a conventional pinned connection between the slide (27) and the actuator (33) could be used. The second actuator could be supported on the slide (27) and have flexible hydraulic lines supplying the actuator. Such a rear jaw lock configuration is shown and described in the second example of a coupler (115) below.

In an alternative configuration the link member or members (53) could be caused to rotate about their pivotal connection to the actuator (33), and to move the rear locking member (37) from its extended position toward its retracted position, due to contact between the link members and a surface on the movable component (27), when the second pivot pin (47) is moved forward within the first elongate slot (49).

In the first example of a coupler (15) the aft jaw (25) is shown and described as being a part of the slide (27). However, it could also be said that the aft jaw (25) is a recess formed between the slide (27) and the body (31).

SECOND EXAMPLE

With reference to FIGS. 15 to 22, a second example of a coupler (115) is described. The coupler (115) is connectable to a movable arm of a vehicle, and is of the type used to couple implements such as buckets to the arms of vehicles, for example to the arms of excavators, earth moving machines, diggers, backhoes, and the like.

The coupler (115) can be connected to the arm of the vehicle using two arm connecting pins (117). The coupler (115) is configured to hold a first connecting pin (119) of an implement in a forward recess or jaw (121), and a second connecting pin (123) of the implement in an aft recess or jaw (125). The forward and the aft recess (121) and (125) each open to opposite directions.

The aft recess (125) is a part of a movable component which is in the form of a slide (127). The slide (127) is connected to a body (131) of the coupler (115) by a slidable connection (132). The slide (127) can slide through a range of travel relative to the body (131), in a substantially fore and aft direction, within guides (129) in the body (131). In this case, the guides (129) are two opposing longitudinal slots, one on each side of the body (131). Movement of the slide (127) in a forward direction is movement substantially toward the forward end of the body (131), that is toward the end of the body (131) having the forward recess (121).

The coupler (115) is provided with a first actuator (133), in this case a hydraulic ram, which can selectively move the slide (127) throughout its range of travel. The first actuator (133) is connected at its forward end to the body (131) using an actuator connecting pin (134), and at its aft end to the slide (127). The actuator (133) can be remotely controlled allowing the coupler (115) to be operated from within the cab of an excavator for example.

The coupler (115) can be used to couple an implement to an arm by first engaging the first connecting pin (119) of the implement within the forward recess (121). The slide (127) must then be positioned close enough to the forward end of its travel to allow the aft recess (125) to be positioned between the first and the second connecting pins (119) and (123). And then the second connecting pin (123) of the implement can be engaged within the aft recess (125) by moving the slide (127) in an aft direction to capture and engage the second connecting pin (123) within the aft recess (125). A hydraulic lock in the hydraulic circuit to the first actuator (133) can be used to hydraulically lock the slide (127) in engagement with the second connecting pin (123) to minimise the possibility of an inadvertent uncoupling of the implement from the arm.

An important aspect of the coupler (115) is the provision of a rear locking member (137) on the slide (127) which is configured to lock the second connecting pin (123) within the aft jaw (125). The rear locking member (137) is movable between an extended position in which the rear locking member (137) can prevent the second connecting pin (123) from exiting the aft jaw (125) and a retracted position in which the rear locking member (137) can allow the second connecting pin (123) to exit the aft jaw (125).

The rear locking member (137) is pivotally mounted to a rear end of the slide (127), using a first pivot pin (138) which passes through a mid section (139) of the rear locking member (137). The rear locking member (137) is biased toward the extended position by a biasing means which in this example includes a compression spring (141) located within a second actuator (143).

The second actuator (143) is pivotally connected at a first end to the slide (127) and at an opposite and second end to the rear locking member (137). Operation of the second actuator (143) moves the rear locking member (137) between its extended position and its retracted position.

The rear locking member (137) is situated in, or adjacent to, the entrance to the aft recess (125). When the rear locking member (137) is in its extended position it stops the second connecting pin (123) from exiting the aft recess (125).

The rear locking member (137) is configured such that when the second connecting pin (123) is situated within the aft jaw (125), the second connecting pin (123) can only push the rear locking member (137) in a direction that is away from its retracted position. When the second connecting pin (123)

is held within the aft jaw (125), if it moves toward the rear locking member (137), it will contact the rear locking member (137) and attempt to rotate or move the rear locking member (137) about its pivotal connection to the slide (127), away from the retracted position. However, stops (145) located on a rear part of the slide (127) prevent further movement or rotation of the rear locking member (137) in this direction.

Both the rear locking member (137) and the second actuator (143) are supported on the slide (127), and they both move with the slide (127). Flexible hydraulic lines are used to supply the second actuator (143).

The rear locking member (137) can be pushed toward its retracted position by the second connecting pin (123) as it enters the aft recess (125)—refer to FIG. 22. When the second connecting pin (123) is being captured within the aft recess (125), the hydraulic line to the second actuator (143) is open to a hydraulic return line meaning that the second actuator (143) can be retracted with little resistance, except that provided by the spring (141). As the second connecting pin (123) enters the aft recess (125) it pushes the rear locking member (137) towards its retracted position, against the force of the spring (141) in the second actuator (143).

When the second connecting pin (123) is fully home within the aft recess (125) it loses contact with the rear locking member (137) and the spring (141) retracts the second actuator (143) and pushes the rear locking member (137) back to its extended position. The second connecting pin (123) remains locked within the aft recess (125) until hydraulic pressure is applied to the second actuator (143) to overcome the force of the spring (141) and to extend the second actuator (143) to move the rear locking member (137) to its retracted position. In use, hydraulic pressure is only applied to the second actuator (143) when uncoupling the coupler (115) from an implement.

The coupler (115) further includes a forward locking member (149) which is movable between an extended position in which the forward locking member (149) can prevent the first connecting pin (119) from exiting the forward recess (121) and a retracted position in which the forward locking member (149) can allow the first connecting pin (119) to exit the forward recess (121).

The forward locking member (149) is pivotally mounted to a forward end of the body (131), using a second pivot pin (150) which passes through the forward locking member (149).

The third actuator (151) is pivotally connected at a first end to the body (131) and at an opposite and second end to the forward locking member (149). Operation of the third actuator (151) moves the forward locking member (149) between its extended position and its retracted position.

The forward locking member (149) is situated in, or adjacent to, the entrance to the forward recess (121). When the forward locking member (149) is in its extended position it stops the first connecting pin (119) from exiting the forward recess (121).

The forward locking member (149) is caused to move between the extended position and the retracted position by a third actuator (151). The third actuator (151) is pivotally connected at a first end to the body (131) and at an opposite and second end to the forward locking member (149). Operation of the third actuator (151) moves the forward locking member (149) between its extended position and its retracted position.

The forward locking member (149) is biased toward the extended position by a biasing means, which in this example includes a compression spring (153) located within the third actuator (151).

The forward locking member (149) can be pushed toward its retracted positioned by the first connecting pin (119) as it enters the forward recess (121)—refer to FIG. 22. When the first connecting pin (119) is being captured within the forward recess (121), the hydraulic line to the third actuator (151) is open to a hydraulic return line meaning that the third actuator (151) can be retracted with little resistance, except that provided by the spring (153). As the first connecting pin (119) enters the forward recess (121) it pushes the forward locking member (149) towards its retracted position, against the force of the spring (153) in the third actuator (151).

When the first connecting pin (119) is fully home within the forward recess (121) it loses contact with the forward locking member (149) and the spring (153) retracts the third actuator (151) and pushes the forward locking member (149) back to its extended position. The first connecting pin (119) remains locked within the forward recess (121) until hydraulic pressure is applied to the third actuator (151) to overcome the force of the spring (153) and to extend the third actuator (151) to move the forward locking member (149) to its retracted position. In use, hydraulic pressure is only applied to the third actuator (151) when uncoupling the coupler (115) from an implement.

FIG. 23 shows a hydraulic circuit (161) suitable for use with the coupler (115). The circuit includes the following components;

- A hydraulic pressure supply line (163) and a hydraulic return line (165), for supplying hydraulic pressure and for providing a return path for hydraulic fluid.
- A pressure reducing valve (167) to protect the first actuator (133) during use of the coupler (115).
- A control valve (169) which can be used to selectively extend or retract the first actuator (133). Extension of the first actuator (133) in the direction indicated by an arrow (170) moves the slide (127) in an aft direction. Movement in this aft direction allows the second connecting pin (123) to be captured and held within the aft recess (125) to allow an implement to be positively coupled to the coupler (115).
- An extend line (171) and a retract line (173). When hydraulic pressure is supplied by the control valve (169) to the extend line (171), pressure is applied to the extend side (175) of the first actuator (133), and conversely, when hydraulic pressure is supplied to the retract line (173), pressure is applied to the retract side (177) of the first actuator (133).
- A first check valve (179) and a second check valve (181) which allow any pressure that may be vented by a relief valve (183) to vent to the hydraulic return line (165), irrespective of the position of the control valve (169).
- A pilot check valve (185) which locks oil in the extend side (175) of the first actuator (133) as a primary locking feature to hold an implement coupled to the coupler (115) even if hydraulic pressure is lost in the extend line (171). The pilot check valve will only open when a predetermined pressure is reached in the retract line (173), for example 2000 pounds per square inch (psi) of pressure.
- A third check valve (187) which is situated in a cross line (189). The cross line (189) provides a flow path between the extend line (171) and the retract line (173). The third check valve (187) prevents hydraulic fluid flowing through the cross line (189) from the extend line (171) to the retract line (173), but allows flow in the opposite direction.

A first flow control (191) in the line between the pilot check valve (185) and the extend side (175) of the first actuator (133), and a second flow control (193) in the cross line (189). A suitable rating for first flow control (191) is in the range of four to six liters per minute (lpm), and preferably approximately five lpm. And a suitable rating for the second flow control (193) is in the range of one to three lpm, and preferably approximately two lpm.

In a typical situation, the control valve (169) would be situated within the cab of an excavator, and the pilot check valve (185), the relief valve (183), the flow controls (191) and (193), and the check valves (179), (181) and (187) would be situated within a valve block (195) situated on the coupler (115), or adjacent to it.

When the coupler (115) is being used to couple an implement to a vehicle, the slide (127) can be moved aft to engage with an implement by supplying hydraulic pressure to the first actuator (133) via the extend supply line (171). At this time, when there is pressure in the extend supply line (171), and the retract supply line (173) is open to return, there is no appreciable pressure in the second and third actuators (143) and (151). This allows the rear locking member (137) and the forward locking member (149) to be pushed to their respective retracted positions as the first connecting pin (119) enters the forward recess (121) and the second connecting pin (123) enters the aft recess (125).

Conversely, when uncoupling an implement, hydraulic pressure is supplied to the retract supply line (173), and the extend supply line (171) is open to return. Initially, until pressure builds up in the retract supply line (173) to a predetermined level, for example two thousand psi, the pilot check valve (185) will remain closed and pressure will be held in the extend side (175) of the first actuator (133) and the line from it to the pilot check valve (185). This pressure holds the third check valve (187) closed.

While the pressure is initially building in the retract supply line (173), and the third check valve (187) is closed, pressure is applied to the second and third actuators (143) and (151). This extends both the second and third actuators (143) and (151) causing the actuators to move their respective locking members (137) and (149) to the locking member's retracted positions.

Then as pressure in the retract supply line (173) rises and reaches the predetermined level (for example two thousand psi), the pilot check valve (185) will open and pressure in the extend side (175) of the first actuator (133) and in the line from it to the pilot check valve (185) will fall. This will allow the third check valve (187) to open, and will allow the pressure in the cross line (189) to begin to fall also.

When the pilot check valve (185) has opened, pressure in the retract supply line (173) and in the retract side (177) of the first actuator (133) will then overcome the pressure in the extend side (175) of the first actuator (133) allowing the first actuator (133) to move the slide (127) forward and out of engagement with the second connecting pin (121), and then allow the coupler (115) to be manipulated to release the first connecting pin (119) also.

The first flow control (191) controls the rate at which the first actuator (133) retracts and creates sufficient back pressure to keep the second and third actuators (143) and (151) extended while the slide (127) is being moved forward for uncoupling. The rate at which the first actuator (133) retracts is determined by the difference between the flow rates of the two flow controls (191) and (193).

The second flow control (193) allows sufficient flow of hydraulic fluid under pressure to keep the second and third actuators (143) and (151) extended while the slide (127) is being moved forward and while there is still back pressure in the line between the extend side (175) of the first actuator (133) and the first flow control (191). However, when the slide (127) is fully forward, pressure in the line between the extend side (175) of the first actuator (133) and the first flow control (191) will fall, causing the pressure in the second and third actuators (143) and (151) to fall to the point where the springs (141) and (153) will overcome the hydraulic pressure and will move the locking members (137) and (149) back to their respective extended positions.

It is envisaged that the coupler (115), or a variation of it, can be included as a part of a vehicle, for example, as part of an excavator, earth moving machine, digger, or backhoe.

Method of Operation of the Second Example

The method of coupling an implement to a vehicle, when using the coupler (115), includes the steps of
engaging the first connecting pin (119) of the implement into the forward recess (121),
manipulating the coupler (115) to allow the second connecting pin (123) of the implement to be engaged in the aft recess (125),
moving the slide (127) partly toward the aft end of its travel and thereby causing the second connecting pin (123) to push the rear locking member (137) from its extended position toward a retracted position, and
continuing to move the slide (127) toward the aft end of its travel until the second connecting pin (123) is engaged within the aft recess (125), and until the rear locking member (137) is allowed to move back to its extended position in which it locks the second connecting pin (123) within the aft recess (125).

The step of engaging the first connecting pin (119) of the implement into the forward recess (121) can also include moving the body component (131) toward the first connecting pin (119) and thereby causing the first connecting pin (119) to push the forward locking member (149) from its extended position toward a retracted position, and continuing to move the body component (131) toward the first connecting pin (119) until the first connecting pin (119) is engaged within the forward recess (121), and until the forward locking member (149) is allowed to move back to its extended position in which it locks the first connecting pin (119) within the forward recess (121).

The method of uncoupling an implement from a vehicle using the coupler (115) includes the steps of;
using the second actuator (143) to retract the rear locking member (137) from the aft recess (125) to allow the second connecting pin (123) of the implement to be released from the aft recess (125),
moving the slide (127) toward a forward end of its travel to disengage the second connecting pin (123) from the aft recess (125).

The method of uncoupling an implement from a vehicle can further include the use of the third actuator (151) to retract the forward locking member (149) from the forward recess (121) to allow the first connecting pin (119) of the implement to be released from the forward recess (121).

The method of uncoupling an implement from a vehicle can also include the step of manipulating the coupler (115) or the implement to remove the first connecting pin (119) from the forward recess (121), after moving the forward locking member (149) to its retracted position.

Variations of the Second Example

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

In the second example described above, the coupler (115) includes a movable component in the form of a slide (127). In an alternative configuration the movable component could have an alternative form of movement, for example a movable component that can move through a range of travel about a pivot.

In the second example described above, the coupler (115) includes separate actuators to operate the forward locking member (149) and the rear locking member (137). However, in an alternative configuration it is envisaged that both the rear locking member (137) and the forward locking member (149) could be caused to move between their respective extended positions and retracted positions by a second actuator only.

In the second example described above, the actuators (133), (143) and (151) are shown and described as hydraulic rams, however, in an alternative configuration the actuators (133), (143) and (151) could be electrical or pneumatic actuators.

In an alternative, or "hybrid", configuration the forward locking member or system of the coupler (115) could be the same as that described above in the first example of a coupler (15), or a variation of it. That is, a "hybrid" coupler (201) having an aft locking member that is mounted on the slide (127) and which is moved between the extended position and the retracted position by a dedicated actuator, and a forward locking member that is moved between the extended position and the retracted position by contact with, and movement of, the slide (127), or which is a part of the forward end of the slide (127).

The method of coupling an implement to a vehicle, when using the coupler (201), would include the same steps as described for the coupler (115) above, and could include either or both of the following two steps;
  moving the slide (127) toward a forward end of its travel, after engaging the first connecting pin in the forward recess, thereby deploying the forward locking member to its extended position in which it locks the first connecting pin within the forward recess.
  moving the movable component of the coupler to an aft end of its travel to retract a forward locking member associated with the forward recess, prior to engaging the first connecting pin of the implement in the forward recess.

The method of uncoupling an implement from a vehicle, when using the coupler (201), would include the same steps as described for the coupler (115) above, and could include either or both of the following two steps;
  manipulating the coupler to allow the movable component to be moved toward the aft end of its travel without re-engaging the second connecting pin into the aft recess, after disengaging the second connecting pin from the aft recess.
  moving the movable component toward the aft end of its travel and thereby causing a forward locking member to be moved from an extended position to a retracted position, to allow the first connecting pin of the implement to be released from the forward recess, after disengaging the second connecting pin from the aft recess.

The hydraulic circuit shown in FIG. 23 shows a common hydraulic supply line from the control valve (169) to the second and the third actuators (143) and (151) and to the first actuator (133). However, in an alternative configuration, a separate control valve and hydraulic circuit could be used to control the operation of the second and the third actuators (143) and (151).

In the second example of a coupler (115) the aft recess (125) is shown and described as being a part of the slide (127). However, in an alternative configuration, the aft jaw (125) could be a recess formed between the slide (127) and the body (131).

THIRD EXAMPLE

With reference to FIGS. 24 to 31, a third example of a coupler (215) is described. The coupler (215) has a rear jaw locking mechanism that is similar to that used on the first example of a coupler (15) described above. And, the coupler (215) has a forward jaw locking mechanism that is similar to that used on the second example of a coupler (115) described above.

To avoid unnecessary repetition the reader is directed to the description of the rear jaw locking mechanism in the first example above for a detailed explanation of the construction and its method of operation of the rear jaw locking mechanism of the coupler (215). Similarly, the reader is directed to the description of the forward jaw locking mechanism in the second example above for a detailed explanation of the construction and method of operation of the forward jaw locking mechanism of the coupler (215).

It can be seen in FIG. 24 that a slide (217) of the third example of a coupler (215) is shorter than the slide (27) in the first example. The slide (217) can be shorter than the slide (27) since there is no requirement for the slide (217) to directly contact and move the forward locking member (219) of the coupler (215).

The coupler (215) has a forward locking member (219) mounted on a body (221) of the coupler (215) which is configured to lock a first connecting pin (223) of an implement within a forward recess or jaw (225). The coupler (215) also has a rear locking member (227) mounted on the slide (217) which is configured to lock a second connecting pin (229) of the implement within an aft recess or jaw (231).

Method of Operation of the Third Example

The method of operation of the coupler (215) is now described with reference to the sequence of views shown in FIGS. 25 to 30. FIGS. 25 to 27 show a coupling sequence, and FIGS. 28 to 30 show a de-coupling sequence.

In FIG. 25 the coupler (215) is show as it is initially engaging the first connecting pin (223) within the forward jaw (225). As the first connecting pin (223) enters the forward jaw (225) the pin pushes the forward locking member (219) to its retracted position. The forward locking member (219) is normally held in its extended position by the action of a biasing member or spring (235) (refer to FIG. 31) associated with a forward lock actuator (233). The first connecting pin (223) overcomes the force of the spring in the forward lock actuator (233) to push the forward locking member (219) to its retracted position as the first connecting pin (223) enters the forward jaw (225).

In FIG. 26 it can be seen that the first connecting pin (223) is fully home within the forward jaw (225), and the forward locking member (219) has been pushed back to its extended position by the spring (235) so that the first connecting pin (223) can no longer exit the forward jaw (225). It can also be seen that the coupler (215) has been re-orientated, and that the slide (217) is at or near a forward-most position of the slide, to allow the second connecting pin (229) to be captured within the aft jaw (231).

It can also be seen that the rear locking member (227) has been pushed to its retracted position by the second connecting pin (229) as the pin begins to enter the aft jaw (231). The rear locking member (227) is biased toward its retracted position by a second spring (not shown in FIG. 24, refer to item 40 in FIG. 2). And the rear locking member (227) is able to move to its retracted position because the rear lock connecting pin (239) is able to slide up the slot (241) in the links (243) that support the rear locking member (227). When the rear locking member (227) is in its extended position the rear lock connecting pin (239) is situated at the bottom of the slot (241) in the links (243), and when the rear locking member (227) is in its retracted position the rear lock connecting pin (239) is situated nearer the top of the slot (241) in the links (243).

In FIG. 27 it can be seen that the slide (217) has been moved aft by a slide actuator (245) to fully capture the second connecting pin (229) within the aft jaw (231). And since the second connecting pin (229) is fully home within the aft jaw (231) the rear locking member (227) has been able to move back to its retracted position under the influence of the second spring.

Now both of the connecting pins (223 & 229) are locked within their respective jaws (225 & 231) on the coupler. When the coupler (215) is used in conjunction with a hydraulic lock to hold pressure within the slide actuator (245) to hold the slide (217) hard against the second connecting pin (229), it will be appreciated that the coupler (215) provides three levels of protection against the inadvertent detachment of an implement.

FIG. 28 shows the beginning of a controlled detachment of an implement from the coupler (215). The first step is the withdrawal of the rear locking member (227). This is achieved by directing hydraulic fluid to the retract side of the slide actuator 245). As the slide actuator (245) begins to retract it pulls a slidable pin (247) along a slot (249) in the slide (217). At this stage, the slide (217) does not yet move forward.

An upper end of each link (243) is connected to the slidable pin (247). And as the upper end of the link (243) is dragged forward by the retracting slide actuator (245), the links (243) pull the rear locking member (227) up toward its retracted position.

FIG. 29 shows the slide (217) pulled forward and out of engagement with the second connecting pin (229). The slide (217) is pulled forward by the slide actuator (245) once the slidable pin (247) reaches a location at or near the forward end of the slot (249) in the slide (217).

When the slide has moved forward to a predetermined point in its range of travel, hydraulic pressure is then directed to the forward lock actuator (233) to move the forward locking member (219) to its retracted position. FIG. 30 shows the forward locking member (219) in its retracted position ready to allow the first connecting pin (223) to be released from the forward jaw (225).

Once the forward lock actuator (233) is retracted, the coupler (215) can then be re-orientated and moved away from the first connecting pin (223) to complete the 20, detachment of the coupler (215) from the implement.

FIG. 31 shows an example of a hydraulic circuit (251) suitable for the coupler (215). The hydraulic circuit (251) includes a manifold block (253) having a first connection point (255) and a second connection point (257), which are each connectable to an external hydraulic system. The external hydraulic system can be, for example, a hydraulic circuit of an excavator which includes a control system that is able to selectively connect either of the connection points (255) or (257) to hydraulic pressure or hydraulic return lines of the external hydraulic system.

A first check valve (259) is situated between the first connection point (255) and a first slide actuator supply line (261), and a second check valve (260) is situated between the second connection point (257) and a second slide actuator supply line (263). The check valves (259) and (260) can be Sun Hydraulics™ model number CXBA XAN free flow nose to side check valves for example.

When pressure is supplied to the first slide actuator supply line (261) the piston of the slide actuator (245) moves in the direction of the arrow (264), retracting the slide actuator (245). This is the direction to move the slide (217) forward, and to disengage the second connecting pin (229) from the aft jaw (231). And conversely, when pressure is supplied to the second slide actuator supply line (263) the piston of the slide actuator (245) moves in the opposite direction of the arrow (264). This opposite direction moves the slide (217) aft, for example to engage the aft jaw (231) with the second connecting pin (229).

A relief valve (265) is situated between the first slide actuator supply line (261) and a forward actuator supply/return line (267). The relief valve (265) can be a Sun Hydraulics™ model number RDBX XAN fixed setting direct-acting relief valve for example.

The relief valve (265) acts as a sequencing valve to restrict pressure to the forward actuator supply/return line (267) and the forward lock actuator (233), until a pre-determined pressure is a reached in the hydraulic supply to the first slide actuator supply line (261). For example, the relief valve (265) can be set to open at a pre-determined pressure in the range of 2500 to 3500 pounds per square inch (psi).

When pressure is supplied to the forward actuator supply/return line (267), the piston of the forward lock actuator (233) moves in the direction of the second arrow (269), extending the forward lock actuator (233). Movement of the piston in this direction causes the forward lock actuator (233) to retract the forward locking member (219). The spring (235) can move the piston in the opposite direction of the second arrow (269) to extend the forward locking member (219) when there is little or no pressure in the forward actuator supply/return line (267).

The relief or sequencing valve (265) has the effect of delaying the retraction of the forward lock actuator (233) until the slide (217) has travelled to a location at or near the forward end of its range of travel. When the slide (217) contacts stops at the forward end of its range of travel, or the slide actuator (245) is fully compressed, the hydraulic pressure in the first slide actuator supply line (261) can increase to closer to the hydraulic system supply pressure. As long as the relief valve (265) is set to open at a pressure that is below the hydraulic system supply pressure, the relief valve (265) can then open allowing the forward lock actuator (233) to be pressurized to retract the forward locking member (219).

The method of uncoupling an implement having two connecting pins from a vehicle, when using the coupler (215), can be described as having the following steps;

retracting the rear locking member (227) from the aft jaw (231) located on the slide (217), to allow the second connecting pin (229) of the implement to be released from the aft jaw (231), moving the slide (217) toward a forward end of its travel to disengage the second connecting pin (229) from the aft jaw (231).

The method can include the use of a first actuator (245) to retract the rear locking member (227). The first actuator (245) can be used to both retract the rear locking member (227) and to move the slide (217). The method ideally includes the use of the first actuator (245) to first retract the rear locking member (227), and then to move the slide (217) forward to disengage the second connecting pin (229) from the aft jaw (231).

The method of uncoupling the implement can also include the step of using a second actuator (233) to retract the forward locking member (227). Ideally the method includes a delay in energising the second actuator (233) to retract the forward locking member (227) until after the second connecting pin (229) has been disengaged the from the aft jaw (231).

The method of uncoupling the implement can also include the step of manipulating the coupler (215) or the implement to remove the first connecting pin (223) from the forward jaw (225), after moving the forward locking member (219) to its retracted position.

Variations of the Third Example

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

The relevant variations described in relation to the first and second examples above apply equally to the third example of a coupler (215).

The third example of a coupler (215) is described as having a slide (217). However, in an alternative configuration the slide (217) could be substituted with another type of movable component, for example a movable component that is pivotally mounted to the body (221).

The third example of a coupler (215) is described as having a sequence valve (251) to delay the supply of hydraulic power to the forward lock actuator (233). However, in an alternative configuration the coupler (215) could include a trigger, switch or sensor that is configured to detect the position of the slide (217) relative to the body (221) and to delay the supply of hydraulic pressure to the forward lock actuator (233) until the slide (217) has been moved forward to a pre-determined point in its range of travel.

Such a trigger, switch or sensor could take a number of forms, for example an electrically operated micro-switch, or a mechanically operated valve.

As with the first or second examples, the actuators of the third example could be electrically or pneumatically operated actuators in lieu of the hydraulic actuators described.

DEFINITIONS

Throughout this specification the word "comprise" and variations of that word, such as "comprises" and "comprising", are not intended to exclude other additives, components, integers or steps.

Advantages

Thus it can be seen that the invention provide a coupler that includes a lock on both the front jaw and the rear jaw. This provides additional safety over couplers having a lock on only a front jaw or a rear jaw. And when used in conjunction with a hydraulic lock, three levels safety can be achieved.

The first example of a coupler achieves three levels of safety and includes only a single actuator. The third example achieves the same with only two actuators. These configurations have minimal complexity and provide a compact overall coupler size. Low profile couplers of the types described herein minimise the reduction in the breakout force achievable using a machine such as a digger or earth moving machine.

The second example has the advantage of locks that can be individually controlled, allowing increased flexibility of operation. The locks can be controlled using the same hydraulic supply to the slide actuator, or they can be controlled by individual hydraulic supplies if required for a two stage uncoupling sequence for example.

General

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

The invention claimed is:

1. A coupler assembly for coupling implements having a first connecting pin and a second connecting pin to a vehicle, the coupler assembly comprising:
    a body component that is connectable to the vehicle, comprising a forward recess for receiving the first connecting pin,
    a movable component, which is supported by the body component, that is movable through a range of travel relative to the body component, the movable component comprising or forming a part of an aft recess for receiving the second connecting pin, and
    an actuator configured to selectively move the movable component relative to the body component,
    wherein the movable component comprises a rear locking member that is movable relative to a main member of the moveable component, and the rear locking member is moveable between an extended position, in which the rear locking member can prevent the second connecting pin from exiting the aft recess, and a retracted position, in which the rear locking member can allow the second connecting pin to exit the aft recess.

2. The coupler assembly as claimed in claim 1, wherein the rear locking member is biased toward the extended position by a biasing means.

3. The coupler assembly as claimed in claim 1, wherein the rear locking member is configured such that when the second pin is situated within the aft recess, the second pin can only push the rear locking member in a direction that is away from its retracted position.

4. The coupler assembly as claimed in claim 1, wherein the movable component is slidable relative to the body component.

5. The coupler assembly as claimed in claim 1, comprising a slidable connection between the actuator and the movable component, the connection comprising a slidable member configured to slide between a forward limit and an aft limit of a guide member.

6. The coupler assembly as claimed in claim 5, wherein the slidable member is a pin and the guide member is an elongate slot in the movable component.

7. The coupler assembly as claimed in claim 6, wherein the slidable member is connected to the actuator, and the slot is a feature of the movable component.

8. The coupler assembly as claimed in claim 1, wherein the rear locking member is linked to the actuator via at least one link member.

9. The coupler assembly as claimed in claim 8, wherein the at least one link member is pivotally connected to the actuator at or adjacent to an upper end of the link member.

10. The coupler assembly as claimed in claim 8, wherein the at least one link member is pivotally connected to the rear locking member at or adjacent to a lower end of the link member.

11. The coupler assembly as claimed in claim 8, wherein the at least one link member is pivotally connected to the actuator at or adjacent to an upper end of the link member, and is pivotally connected to the rear locking member at or adjacent to a lower end of the link member, and the distance between the pivotal connection of the rear locking member to the at least one link member and the pivotal connection of the at least one link member to the actuator, is a variable distance.

12. The coupler assembly as claimed in claim 8, wherein the rear locking member is connected to the at least one link member via a slidable connection.

13. The coupler assembly as claimed in claim 5, wherein the rear locking member is linked to the actuator via at least one link member, and movement of the slidable connection from the aft limit toward the forward limit causes the link member to pull the rear locking member from its extended position and toward its retracted position.

14. The coupler assembly as claimed in claim 1, wherein the rear locking member can be pushed toward its retracted position by the second connecting pin as it enters the aft recess.

15. The coupler assembly as claimed in claim 1, further comprising a forward locking member that is movable between an extended position, in which the forward locking member can prevent the first connecting pin from exiting the forward recess, and a retracted position, in which the forward locking member can allow the first connecting pin to exit the forward recess.

16. A vehicle incorporating at least one coupler assembly as claimed in claim 1.

17. The coupler assembly as claimed in claim 2, wherein the biasing means is a spring.

18. A coupler assembly as claimed in claim 1, further comprising a second actuator mounted on the movable component, the second actuator configured to move the rear locking member between the extended position and the retracted position.

19. A coupler assembly as claimed in claim 1, wherein the movable component is configured such that when the second pin is received in the aft recess and the rear locking member is in the extended position, the second pin is only able to push the rear locking member in a direction that is away from the retracted position.

20. A coupler assembly as claimed in claim 1, wherein the movable component is configured such that when the second pin is received in the aft recess and the rear locking member is in the extended position, and if the second pin attempts to move out of the aft recess, then the second pin pushes the rear locking member toward one more stop or stops on the movable component.

* * * * *